(12) United States Patent
Idota et al.

(10) Patent No.: US 6,235,427 B1
(45) Date of Patent: May 22, 2001

(54) NONAQUEOUS SECONDARY BATTERY CONTAINING SILICIC MATERIAL

(75) Inventors: Yoshio Idota; Akihiro Matsufuji; Nobufumi Mori; Akira Kase; Yoshikatsu Kagawa; Hajime Miyamoto, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/309,309

(22) Filed: May 11, 1999

(30) Foreign Application Priority Data

| May 13, 1998 | (JP) | 10-130836 |
| Jun. 12, 1998 | (JP) | 10-165501 |
| Jun. 15, 1998 | (JP) | 10-167446 |
| Jun. 18, 1998 | (JP) | 10-171665 |

(51) Int. Cl.⁷ .................................................. H01M 4/58
(52) U.S. Cl. .................................. 429/218.1; 429/231.1; 429/223; 429/224; 429/209; 29/623.1
(58) Field of Search .................. 429/218.1, 231.1, 429/223, 224, 209; 29/623.1

(56) References Cited

U.S. PATENT DOCUMENTS

| 4,820,599 | 4/1989 | Furukawa et al. ............. 429/194 |
| 5,556,721 | 9/1996 | Sasaki et al. ................. 429/218 |
| 5,624,606 | * 4/1997 | Wilson et al. ............... 429/218.1 |
| 5,869,208 | * 2/1999 | Miyasaka .................... 429/224 |

* cited by examiner

*Primary Examiner*—Laura Weiner
(74) *Attorney, Agent, or Firm*—Sughrue, Mion, Zinn, Macpeak & Seas, PLLC

(57) ABSTRACT

A nonaqueous secondary battery is disclosed, comprising a positive electrode having a positive electrode active material, a negative electrode having a negative electrode material, and a nonaqueous electrolyte, wherein the positive electrode active material is a transition metal oxide capable of intercalating and deintercalating lithium, and the negative electrode material comprises at least one silicic material capable of intercalating and deintercalating lithium selected from silicon, a silicon alloy and a silicide, and a process for producing the nonaqueous secondary battery is disclosed.

12 Claims, 1 Drawing Sheet

NONAQUEOUS SECONDARY BATTERY CONTAINING SILICIC MATERIAL

FIELD OF THE INVENTION

This invention relates to a nonaqueous secondary battery and particularly a lithium secondary battery having a high capacity and a long cycle life.

1. Background of the Invention

A lithium secondary battery comprising a negative electrode material containing no metallic lithium and a positive electrode active material containing lithium is first subjected to a charging reaction, i.e., intercalation of lithium of the positive electrode active material into the negative electrode material to activate the negative electrode material. The reversal discharge reaction consists of intercalation of lithium ions from the negative electrode material to the positive electrode active material. Carbon has been used as a negative electrode material of this type of lithium batteries. The theoretical capacity of carbon in the form of $C_6Li$ is 372 mAh/g. A negative electrode material having a higher capacity has been awaited.

It has been known that the theoretical capacity of silicon which forms an intermetallic compound with lithium is higher than that of carbon, exceeding 400 mAh/g. For example, JP-A-5-74463 and JP-A-7-29602 disclose a single crystal of silicon and amorphous silicon, respectively. JP-A-63-66369, JP-A-63-174275, and JP-A-63-285865 teach Li—Al-based alloys containing 19 wt %, 0.05 to 1.0 wt % and 1 to 5 wt %, respectively, of silicon. In all these prior art references teaching silicon-containing alloys, compounds containing no lithium are used as a positive electrode active material because the alloys mainly comprise lithium. An alloy containing 0.05 to 1.0 wt % of silicon is proposed in JP-A-4-109562. JP-A-62-226563 teaches a method comprising mixing graphite powder with a powdered metal capable of forming an alloy with lithium. However, batteries obtained by using the conventional silicon-based negative electrode materials fail to have a sufficient cycle life for practical use.

The poor cycle life of lithium secondary batteries using a silicic material as a negative electrode material seems attributable to the low electron conductivity of silicon and volume expansion of the silicic negative electrode material on lithium intercalation, which would make the material finely powdered.

2. Summary of the Invention

An object of the present invention is to provide a lithium secondary battery having an increased energy quantity and a prolonged cycle life.

The object of the invention is accomplished by a nonaqueous secondary battery comprising a positive electrode having a positive electrode active material, a negative electrode having a negative electrode material, and a nonaqueous electrolyte, wherein the positive electrode active material is a transition metal oxide capable of intercalating and deintercalating lithium, and the negative electrode material comprises at least one silicic material capable of intercalating and deintercalating lithium selected from silicon, a silicon alloy and a silicide; and a process for producing the nonaqueous secondary battery.

According to the present invention, a nonaqueous secondary battery having an improved energy quantity and an improved cycle life is provided.

DETAILED DESCRIPTION OF THE INVENTION

Figure 1:
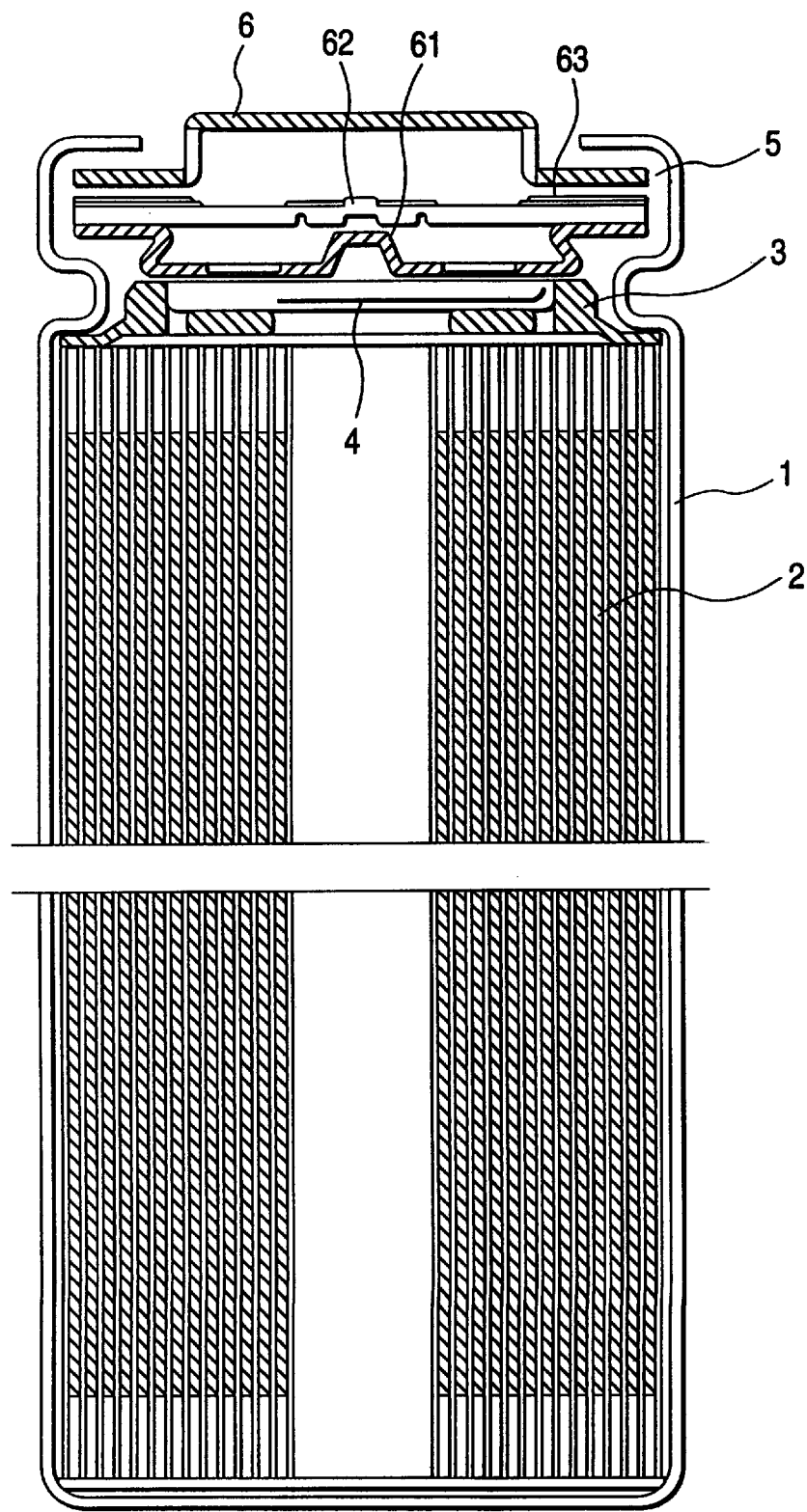
FIG. 1 is a cross section of a cylindrical battery prepared in Examples.

The positive or negative electrode which can be used in the present invention is prepared by applying a mixture containing a positive electrode active material or a negative electrode material to a respective current collector, followed by molding. The mixture can additionally contain an electrically conducting agent, a binder, a dispersant, a filler, an ion conducting agent, a pressure increasing agent, and other various additives. The electrodes may be sheets, disks or plates, preferably sheets (particularly preferably flexible sheets).

The silicic material capable of intercalating and deintercalating lithium which can be used as a negative electrode material is selected from silicon simple substance, a silicon alloy, and a silicide. The silicic material may be a single crystal or a polycrystal or amorphous. The silicon as a simple substance preferably has a purity of 85% by weight or more, still preferably 95% by weight or more, particularly 99% by weight or more. Examples of impurities which may be present in silicon in an amount up to about 0.5% by weight include Fe, Al, Ca, Mn, Mg, Ni, and Cr. As is well known, silicon particles are covered with a silicon dioxide layer, which appears to serve as an ion conducting film.

The average particle size of the silicic material is preferably 0.001 to 10 $\mu$m, more preferably 0.001 to 5 $\mu$m, further more preferably 0.002 to 2 $\mu$m, particularly preferably 0.005 to 0.5 $\mu$m. Particles of this size are generally called ultrafine particles, extremely small compared with, for example, commercially available silicon powder whose size is one micron to several hundreds of microns. Such ultrafine particles can be obtained, for example, by pulverizing coarse particles of the order of several to several tens of microns or through thermochemical reaction by laser heat. The inventors have ascertained that use of such ultrafine silicic materials reduces expansion of the negative electrode on lithium intercalation thereby to improve the battery life.

The silicic material which can be used in the present invention is coated with a plurality of materials. The silicic material has on a silicon surface thereof a coated surface comprising the plural materials. The coating rate of the silicic material is preferably 10% or more, particularly preferably 20% or more.

The rate of expansion of the negative electrode comprising the silicic material upon lithium intercalation is in a range of from 1.05 to 3.0, preferably 1.05 to 2.0, still preferably 1.05 to 1.5, particularly preferably 1.05 to 1.2. The terminology "rate of expansion" as used here for the expansion of the negative electrode on lithium intercalation is defined to be [thickness of lithium-intercalated negative electrode material mixture layer]÷[thickness of lithium-deintercalated negative electrode material mixture layer].

The thickness of the lithium-intercalated negative electrode material mixture layer is measured as follows. A battery is charged so that the single negative electrode may have an open circuit voltage of 0.05 V against a metallic lithium counter electrode. The battery thus charged is disassembled in an argon gas atmosphere, and the thickness of the negative electrode material layer is measured. On the other hand, the thickness of the lithium-deintercalated negative electrode material mixture layer is measured by discharging a battery so that the single negative electrode may have an open circuit voltage of 0.5 V against a metallic lithium counter electrode, disassembling the discharged battery in an argon gas atmosphere, and measuring the thickness of the negative electrode material layer. In the above measurement, an open circuit voltage of 0.045 V or higher and lower than 0.055 V is regarded as 0.05 V, and that of 0.45 V or higher and lower than 0.55 V is regarded as 0.5 V.

It is considered that alloying is effective in suppressing silicon from being powdered due to expansion and contraction on lithium intercalation and deintercalation and in improving electric conductivity of silicon. Silicon alloys with alkaline earth metals, transition metals or semi-metals are preferred. Solid solution alloys and eutectic alloys are particularly preferred. Solid solution alloys are alloys in a solid solution state and include, for example, an Si—Ge alloy. Eutectic alloys are alloys with a metal that undergoes eutectoid reaction with silicon in any ratio on cooling to provide an eutectoid (a mixed structure of silicon and the metal). Be, Ag, Al, Au, Cd, Ga, In, Sb, Sn, and Zn form eutectic alloys with Si.

Preferred metals forming silicon alloys include Ge, Be, Ag, Al, Au, Cd, Ga, In, Sb, Sn, and Zn. Ge, Ag, Al, Cd, In, Sb, Sn, and Zn are still preferred. Silicon alloys comprising two or more of these alloying metals are also preferred.

The ratio of the alloying metal(s) other than silicon to the silicon is desirably 5 to 2000% by weight, more desirably 10 to 500% by weight, most desirably 20 to 60% by weight, based on silicon. Eutectic alloys may further contain Mg, Fe, Co, Ni, Ti, Mo, and W in an amount of preferably more then 0 to 20% by weight, more preferably 0.1 to 10% by weight, based on silicon.

By forming the silicon alloys comprising silicon and the alloying metals other than silicon, the improved electrical conductivity can be obtained. From the standpoint of the battery characteristics such as discharge capacity, high rate characteristics and cycle life, it is preferable for the alloy to have 10 or more times as much specific conductivity as silicon simple substance (i.e., a silicon before aloying).

A silicon alloy is prepared by calcining or mechanical milling method. The calcining method is carried out by mixing raw material metals, putting the mixture in a crucible, elevating the temperature at a rate of 5 to 100° C./min in an inert gas, keeping the mixture at 1000 to 1800° C., preferably 1300 to 1700° C., for 10 minutes to 24 hours, preferably 30 minutes to 5 hours, in the inert gas, and cooling at a rate of 10° C./min or higher, preferably 100° C./min or higher. The inert gas preferably includes argon, nitrogen, hydrogen, etc. or a mixture thereof. The cooling is preferably followed by annealing in an inert gas at a temperature of from 200° C. to a point at which part of the alloy does not melt.

The mechanical milling method is carried out by milling two or more metals into ultrafine particles by means of a mill, such as a ball mill, a planetary ball mill, a vibration mill, etc. The cell of the mill is preferably filled with an inert gas, such as argon, nitrogen, hydrogen or a mixture thereof; an inert liquid, such as oxygen-free water or an alcohol; a reducing gas, such as ammonia or sulfurous acid gas; or a reducing liquid, such as an aqueous solution of sodium sulfite, sodium thiosulfate, hydroxylamine or hydroquinone, or a dimethylsulfoxide solution. Milling in an inert gas atmosphere is particularly preferred. A preferred milling time is 1 to 48 hours.

The alloy preferably has an average particle size of 0.001 to 10 $\mu$m, still preferably 0.001 to 5 $\mu$m, further still preferably 0.002 to 2 $\mu$m, particularly preferably 0.005 to 0.5 $\mu$m. Pulverization for obtaining this size is carried out using a vibration mill, a ball mill, a planetary ball mill, a jet mill, an automatic mortar, and so forth. A preferred pulverization time is 1 minute to 1 hour. The atmosphere for pulverization is the same as described as to mechanical milling.

The term "silicide" as used herein means a metal silicide comprising a metal and silicon. Suitable examples of the silicides which can be used in the present invention include $CaSi$, $CaSi_2$, $Mg_2Si$, $BaSi_2$, $SrSi_2$, $Cu_5Si$, $FeSi$, $FeSi_2$, $CoSi_2$, $Ni_2Si$, $NiSi_2$, $MnSi$, $MnSi_2$, $MoSi_2$, $CrSi_2$, $TiSi_2$, $Ti_5Si_3$, $Cr_3Si$, $NbSi_2$, $NdSi_2$, $CeSi_2$, $SmSi_2$, $DySi_2$, $ZrSi_2$, $WSi_2$, $W_5Si_3$, $TaSi_2$, $Ta_5Si_3$, $TmSi_2$, $TbSi_2$, $YbSi_2$, $YSi_2$, $ErSi$, $ErSi_2$, $GdSi_2$, $PtSi$, $V_3Si$, $VSi_2$, $HfSi_2$, $PdSi$, $PrSi_2$, $HoSi_2$, $EuSi_2$, $LaSi$, $RuSi$, $ReSi$, and $RhSi$.

Of the silicic materials according to the present invention, silicon obtained by removing metal from a metallic silicide is preferred for improving the cycle life. Silicon particles of this species include porous fine particles of 1 $\mu$m or smaller and porous secondary particles (aggregated) composed of fine particles. The improvement on the cycle life seems to be attributed to their character of being hardly powdered. The metal of the metal silicide is preferably an alkali metal or an alkaline earth metal, with Li, Ca or Mg being preferred. Lithium silicide is particularly preferred. The average particle size of the metal silicide, from which the metal is to be removed, is preferably 0.001 to 10 $\mu$m, still preferably 0.001 to 5 $\mu$m, further still preferably 0.002 to 2 $\mu$m, particularly preferably 0.005 to 0.5 $\mu$m, for the reasons hereinafter described. The lithium silicide preferably has a lithium content of 100 to 420 mol %, particularly 200 to 420 mol %, based on silicon.

Removal of metal from the alkali metal or alkaline earth metal silicide is preferably performed by a treatment with a solvent reactive with the alkali metal or alkaline earth metal, preferably water or an alcohol. In treating lithium silicide, it is preferred to use a degassed and dehydrated alcohol for preventing silicon in reaction from oxidation. The degree of dehydration of the alcohol is preferably 1000 ppm or less, still preferably 200 ppm or less, especially 50 ppm or less, in terms of residual water content. Degassing and dehydration are carried out, for example, by bubbling an inert gas, e.g., argon, through the alcohol under reflux. Suitable examples of the alcohols include methyl alcohol, ethyl alcohol, 1-propyl alcohol, 2-propyl alcohol, 1-butyl alcohol, 2-butyl alcohol, t-butyl alcohol, 1-pentyl alcohol, 2-pentyl alcohol, and 3-pentyl alcohol, with 1-propyl alcohol, 2-propyl alcohol, 1-butyl alcohol, 2-butyl alcohol, and t-butyl alcohol being preferred. To remove Ca or Mg, water is used for preference. A combined use of a pH buffer which keeps the system in around neutrality is recommended. The solvent is used in an amount equal to or more than the reaction equivalent, preferably about 10 times the reaction equivalent. While not limiting, the reaction temperature is preferably not higher than room temperature in order to let the reaction proceed mildly and uniformly.

After completion of the reaction, the residual silicon powder is collected by filtration or decantation and is preferably washed with the above-described solvents, such as water and alcohols.

It is preferred for the resulting powder to have a residual metal content of not higher than 1% by weight, particularly 0.1% by weight or lower. To minimize the residual metal content it is desirable to reduce the particle size of the silicide to be reacted to, preferably, 0.001 to 10 $\mu$m, still preferably 0.001 to 5 $\mu$m, further still preferably 0.002 to 2 $\mu$m, particularly preferably 0.005 to 0.5 $\mu$m, as stated above. For the same purpose, it is also preferred that the resulting powder be pulverized and again treated with the solvent to remove the residual metal. The pulverization and the following solvent treatment can be repeated according to necessity.

It is preferred for the silicon powder thus obtained be coated with metal as hereinafter described for further improving discharge capacity and cycle life.

It is preferred for the silicic material to have ceramic adhered thereto. Adhesion of ceramic to the silicic material is effective in inhibiting the silicic material from powdering. Particularly, adhesion of ceramics to simple substance of silicon (e.g., silicon powder) as the silicic material is effective in inhibiting the silicon from powdering. Ceramics that do not in principle react with lithium are preferably used. In particular, $Al_2O_3$, $SiO_2$, $TiO_2$, SiC, and $Si_3N_4$ are preferred. $SiO_2$, especially colloidal $SiO_2$, is still preferred.

Adhesion of ceramic onto the silicon (powder) can be achieved by mixing, heating, vacuum evaporation or chemical vapor deposition (CVD). Combination of mixing and heating is preferred. For example, a colloidal solution of $Al_2O_3$ or $SiO_2$ (colloidal the silica) and the silicon (powder) are dispersively mixed and heated, and the resulting mass of a solid solution is ground to obtain $Al_2O_3$- or $SiO_2$-adhered silicon. In this case, the term "adhered" denotes a state in which the surface of $Al_2O_3$ or $SiO_2$ particles is covered with silicon (powder), a state in which silicon (powder) is contained in the inside of an $Al_2O_3$ or $SiO_2$ mass, or a state in which silicon (powder) is covered with $Al_2O_3$ or $SiO_2$. The dispersive mixing is carried out by mechanical stirring, ultrasonic means or kneading. The heating is preferably conducted in an inert gas, e.g., argon, nitrogen or hydrogen or a mixture thereof, at 300 to 1600° C., particularly 400 to 1500° C., especially 500 to 1300° C., for 0.5 to 24 hours. The grinding is effected in a well-known manner by means of a ball mill, a vibration mill, a planetary mill, a jet mill, an automatic mortar, etc. The atmosphere set forth above regarding the mechanical milling is preferred for this grinding operation. An inert gas atmosphere is particularly preferred. The ceramic is preferably used in a mixing ratio of 2 to 50%, particularly 3 to 40%, by weight based on silicic material (e.g., silicon powder). The silicic material (e.g., silicon powder) to be treated preferably has an average particle size of 0.001 to 10 $\mu$m, preferably 0.001 to 5 $\mu$m, more preferably 0.002 to 2 $\mu$m, especially preferably 0.005 to 0.5 $\mu$m. This particle size is observed by the electron microscope.

It is preferred for the silicic material of the present invention to be coated with metal for further improving discharge capacity and cycle life. Coating with metal can be achieved by electroplating, substitutional plating, electroless plating, vapor deposition techniques, such as resistance heating vapor deposition, electron beam deposition, and cluster ion deposition, sputtering, and CVD (Chemical Vapor Deposition). Electroless plating, resistance heating vapor deposition, electron beam deposition, cluster ion deposition, sputtering, and CVD are particularly preferred. Metal pressing by use of a high shear mill, a stamp mill or a roll mill is also useful. Of these techniques electroless plating is particularly preferred. For the details of electroless plating, reference can be made to Denki Mekki Kenkyukai (ed.), *Mudenkai Mekki Kiso to Ohyo*, The Nikkan Kogyo Shinbun Ltd. (1994). Reducing agents that are preferably used in an electroless plating bath include phosphinates, phosphonates, borohydrides, aldehydes, saccharides, amines, and metal salts. Specific examples of preferred reducing agents include sodium hydrogenphosphinate, sodium hydrogenphosphonate, sodium borohydride, dimethylamineboran, formaldehyde, sucrose, dextrin, hydroxylamine, hydrazine, ascorbic acid, and titanium chloride. In addition, the plating bath preferably contains a pH adjustor and a chelating agent. Examples of these additives are given in the above literature. Suitable plating bath compositions are also described in the above literature. The reducing agent is preferably used in a concentration of 10 to 500 g per liter of water. While not limiting, the pH of the plating bath is preferably 4 to 13. The temperature of the plating bath is preferably 10 to 100° C., particularly 20 to 95° C. An activation bath comprising a hydrochloric acid aqueous solution containing $SnCl_2$ and a nucleation bath comprising a hydrochloric acid aqueous solution containing $PdCl_2$ are used in addition to the plating bath. A filtration step, a washing step, a grinding step, and a drying step are appropriately combined with the above baths.

The silicic material to be coated with metal may be particulate, lumpy or tabular. The coating metal is not limited as long as it has high electrical conductivity. Ni, Cu, Ag, Co, Fe, Cr, W, Ti, Au, Pt, Pd, Sn, and Zn are preferred. Ni, Cu, Ag, Co, Fe, Cr, Au, Pt, Pd, Sn, and Zn are still preferred. Ni, Cu, Ag, Pd, Sn, and Zn are particularly preferred. While the amount of the coating metal is not particularly limited, it is preferably decided so that the metal-coated silicic material may have 10 or more times as much specific conductivity as the untreated silicic material. From this viewpoint, a preferred amount of the coating metal ranges from 1 to 80% by weight, more preferably 1 to 50% by weight, especially 1 to 30% by weight, based on silicon of the silicic material.

It is preferred for the silicic material of the present invention to be partially coated with a synthetic resin for further improving the cycle life. It seems that the resin-coated silicic material is prevented from being powdered on lithium intercalation thereby to bring about an improved cycle life.

Thermoplastic resins are preferred as compared with thermosetting resins for securing the improved cycle life. Suitable examples of the thermoplastic resins include fluorine-containing polymers, imide polymers, vinyl polymers, acrylate polymers, ester polymers, and polyacrylonitrile. Those hardly swellable with an electrolytic solution are preferred. Examples of such thermoplastic resins include water-soluble polymers, such as carboxymethyl cellulose, polyacrylic acid, sodium polyacrylate, polyvinylphenol, polyvinyl methyl ether, polyvinyl alcohol, polyvinylpyrrolidone, polyacrylamide, polyhydroxy(meth) acrylates, and a styrene-maleic acid copolymers; and emulsions (latices) or suspensions of polyvinyl chloride, polytetrafluoroethylene, polyvinylidene fluoride, a tetrafluoroethylene-hexafluoropropylene copolymer, a vinylidene fluoride-tetrafluoroethylene-hexafluoropropylene copolymer, polyethylene, polypropylene, an ethylene-propylene-diene terpolymer (EPDM), sulfonated EPDM, polyvinylacetal resins, (meth) acrylic acid ester copolymers comprising a (meth)acrylic ester unit (e.g., methyl methacrylate or 2-ethylhexyl acrylate), a (meth)acrylic ester-acrylonitrile copolymer, polyvinyl ester copolymers comprising a vinyl ester unit (e.g., vinyl acetate), a styrene-butadiene copolymer, an acrylonitrile-butadiene copolymer, polybutadiene, neoprene rubber, fluororubber, polyethylene oxide, polyester polyurethane resins, polyether polyurethane resins, polycarbonate polyurethane resins, polyester resins, phenol resins, and epoxy resins. Preferred of them are a latex of a polyacrylate, carboxymethyl cellulose, polytetrafluoroethylene and polyvinylidene fluoride. These resins can be used either individually or as a mixture thereof. Fluorine-containing polymers are preferred of the above-described resins. Polytetrafluoroethylene and polyvinylidene fluoride are particularly preferred.

Coating method of the silicic material with the resin is preferably carried out by dissolving or dispersing a resin in a solvent, mixing the silicic material into the resin solution or dispersion, kneading the mixture, drying dispersion, and grinding the resulting solid to powder. Any solvent capable of dissolving the resin can be used. N-Methyl-2-pyrrolidone or dimethylformamide are preferred for polyvinylidene fluoride. Another preferred coating method comprises mixing a resin powder and the silicic material powder uniformly, heating the mixed powder to melt the thermoplastic resin, and grinding the resulting solid. Grinding of the solid is preferably conducted in an inert gas atmosphere, such as argon, in order to suppress side reactions such as oxidation of the silicic material.

The above-enumerated thermoplastic resin are generally known for their use as a binder of the negative electrode material mixture layer. When used as a binder, the resin is uniformly mixed with an active material, an electrically conducting agent, and the like, whereas the resin used in the present invention as a coating material is localized on the surface of the active material. It has been known that an increase of the thermoplastic resin as a binder tends to improve the cycle life, but a greater cycle life improving effect is produced where the resin exists on the surface of the active material.

The thermoplastic resin is preferably used in an amount of 2 to 30% by weight, particularly 3 to 20% by weight. It is desirable for the resin to be present on part of the particulate silicic material. A preferred coating area ratio is 5 to 95%, particularly 5 to 90%, expressed by a percentage of the area coated with the thermoplastic resin to the total surface area of the silicic material particles.

Since a thermoplastic resin is generally insulating, the resin coating is desirably combined with a known means for increasing the electrical conductivity, such as combined use of carbon particles, combined use of metallic particles, or metal plating. The resin-coated particles preferably have an average particle size of 0.002 to 20 $\mu$m, more preferably 0.005 to 5 $\mu$m, particularly 0.01 to 2 $\mu$m.

In mixing the resin-coated particles, an electrically conducting agent, a binder, etc. to prepare a negative electrode material mixture, it is preferred to use a dispersing medium that does not dissolve the coating resin. For instance, when polyvinylidene fluoride is used for coating, water is a preferred dispersing medium.

The above-mentioned grinding methods and grinding atmospheres also apply to the preparation of resin-coated particles. In order to impart electrical conductivity to the resin-coated particles, the above-described metal coating method is preferably carried out in combination.

In the present invention, the silicic material is preferably used as a mixture with a carbonaceous material which is commonly employed as a conducting agent or a negative electrode material. Useful carbonaceous materials include non-graphitizing carbon and graphitized carbon. Specific examples of suitable carbonaceous materials are carbon materials having a specific interplanar spacing, a specific density and a specific crystallite size (see JP-A-62-122066, JP-A-2-66856, and JP-A-3-245473); a mixture of natural graphite and artificial graphite (JP-A-5-290844); vapor growth carbon (JP-A-63-24555, JP-A-63-13282, JP-A-63-58763, and JP-A-6-21261); a material showing X-ray diffraction peaks corresponding to a plurality of 002 faces which is obtained by calcining non-graphitizing carbon at temperatures exceeding 2400° C. (JP-A-5-182664); mesophase carbon obtained by calcining pitch (JP-A-5-307957, JP-A-5-307958, JP-A-7-85862, and JP-A-8-315820); graphite having a coating layer (JP-A-6-84516); carbon materials of various shapes, such as particles, spheres, tabular shape, fine fibers and whiskers; calcining products of phenol resins, acrylonitrile resins or furfuryl alcohol resins; and polyacene materials containing a hydrogen atom.

Suitable examples of electrically conducting agents include natural graphite species such as scaly graphite, flaky graphite, and earthy graphite; artificial graphite species such as those obtained by calcining petroleum coke, coal coke, cellulosic materials, saccharides, mesophase pitch, etc. at high temperature and vapor-phase growth graphite; carbon black species such as acetylene black, furnace black, Ketjen black, channel black, lamp black, and thermal black; carbon materials such as asphalt pitch, coal tar, activated carbon, mesophase pitch, and polyacene. These carbonaceous materials can be used either individually or as a mixture thereof.

In particular, the carbon materials described in JP-A-5-182664, various particulate, spherical, tabular, fibrous or whisker carbon materials, mesophase pitch, calcining products of phenol resins or acrylonitrile resins, and polyacene materials containing a hydrogen atom are preferred. Flaky natural graphite is especially preferred for making the electrode material mixture layer stronger.

The carbonaceous material is preferably used at a mixing ratio of 5 to 1900% by weight, particularly 20 to 500% by weight, especially 30 to 400% by weight, based on the silicic material. While not limiting, the carbonaceous material preferably has an average particle size of 0.01 to 50 $\mu$m, particularly 0.02 to 30 $\mu$m, especially 0.05 to 5 $\mu$m.

Electrically conducting agents which can be used in the present invention include not only the above-described carbonaceous materials but other materials, preferably Ni, Cu, Ag, Fe, etc. as hereinafter described.

As an indication of a charge and discharge range of the negative electrode material comprising the silicic material, the atomic ratio of lithium capable of intercalation and deintercalation to silicon, being expressed by x in $Li_xSi$, preferably x ranges from 0 to 4.2. Further, it has been revealed that the cycle life is greatly improved due to silicon when the degree of charging and discharging in terms of x falls within a range of from 0 to 3.7. When x is 4.2, the charge potential was 0.0 V, inclusive of the overpotential, against the counter metallic lithium electrode. When x is 3.7, it was about 0.05 V. At this time the form of the discharge curve changed. When charging is stopped at a charge potential of 0.0 V, the curve becomes flat at around 0.5 V (with respect to metallic lithium), whereas when charging is stopped at a charge potential of 0.05 V or higher, especially 0.08 V (x=3.6) or higher, there is obtained a mild curve having an average voltage of about 0.4 V. In other words, the inventors have found a peculiar phenomenon that the discharge potential is decreased by increasing the final charge voltage.

A phenomenon that the reversibility of the charge and discharge reaction is improved was also confirmed.

In the final charging method, an open circuit current voltage charge, a closed circuit constant voltage charge, a current charge, a time charge, a large current charge followed by a small current charge, and the like can be used. It is particularly preferred that the current for a closed circuit constant voltage charge is set, and the charging time is set accordingly.

A constant voltage is decided within the above range. The charge is preferably stopped when the current falls within a range of 0.1 to 10% of a 1-hour charging rate in the constant voltage region.

While various embodiments effective in improving a cycle life while retaining a high capacity of the silicic material have been described individually, it has been confirmed that more excellent effect can be produced by appropriately combining these embodiments.

The silicic material can be used in combination with other negative electrode materials capable of intercalating and deintercalating lithium, such as the above-described carbonaceous materials, oxide materials, nitride materials, sulfide materials, metallic lithium, and lithium alloys. Where a transition metal oxide is used as a positive electrode material as in the present invention, the silicic material is preferably combination-used with metallic lithium or a lithium alloy.

In the present invention, transition metal oxides capable of intercalating and deintercalating lithium are used as a positive electrode active material. Lithium-containing transition metal oxides are preferred. Li-containing transition metal oxides consisting mainly of lithium and at least one transition metal element selected from the group consisting of Ti, V, Cr, Mn, Fe, Co, Ni, Mo, and W at a lithium to transition metal molar ratio of 0.3 to 2.2 are preferred. Still preferred are those consisting mainly of lithium and at least one transition metal element selected from the group consisting of V, Cr, Mn, Fe, Co, and Ni at a lithium to transition metal molar ratio of from 0.3 to 2.2. The Li-containing transition metal oxides may contain Al, Ga, In, Ge, Sn, Pb, Sb, Bi, Si, P, B, etc. in a proportion of less than 30 mol % based on the total transition metals.

Of the above-described positive electrode active materials preferred are those represented by formula $Li_xMO_2$ (wherein M is at least one of Co, Ni, Fe, and Mn; and x is from 0 to 1.2) and those having a spinel structure represented by formula $Li_yMn_2O_4$ (wherein y is from 0 to 2). Examples of such materials are $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (wherein x=0.02 to 1.2; a=0.1 to 0.9; b=0.8 to 0.98; c=1.6 to 1.96; and z=2.01 to 2.3).

Also preferred are those represented by formula $Li_yM_aD_{1-a}O_2$ (wherein M is at least one of Co, Ni, Fe, and Mn; D is at least one metal different from M and selected from Co, Ni, Fe, Mn, Al, Zn, Cu. Mo, Ag, W, Ga, In, Sn, Pb, Sb, Sr, B, and P; y=0 to 1.2; and a=0.5 to 1) and those having a spinel structure represented by formula $Li_z(Mn_bE_{1-b})_2O_4$ (wherein E is at least one of Co, Ni, Fe, Al, Zn, Cu, Mo, Ag, W, Ga, In, Sn, Pb, Sb, Sr, B, and P; b=1 to 0.2; z=0 to 2).

Particularly preferred are $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein x=0.02 to 1.2; a=0.1 to 0.9; b=0.9 to 0.98; z=2.01 to 2.3). The value x in the above formulae is the one before commencement of charging and discharging and varies with charges and discharges.

The Li-containing transition metal oxide as a positive electrode active material is synthesized by mixing a lithium compound and at least one transition metal compound, followed by calcining (calcining method) or by reacting these materials in a solution (solution method). The calcining method is preferred. The details of calcining described in JP-A-6-60867 and JP-A-7-14579 apply to the present invention. The positive electrode active material obtained by calcining can be washed with water, an aqueous acid solution, an aqueous alkali solution, or an organic solvent before use.

Li-containing transition metal oxides can also be synthesized by chemically inserting lithium ions into a transition metal oxide by reacting metallic lithium, a lithium alloy or butyl lithium with a transition metal oxide.

While not limiting, the positive electrode active material preferably has an average particle size of from 0.1 to 50 μm.

It is preferred that the total volume of the particles having a particle size of from 0.5 to 30 μm occupies 95% or more of the total particle volume. It is still preferred that the volume ratio of a group of particles having a particle size of 3 μm or smaller is not more than 18% of the total particles and the volume ratio of a group of particles having a particle size of 15 to 25 μm is not more than 18% of the total particles. While the specific surface area of the positive electrode active material is not particularly limited, it is preferably 0.01 to 50 m$^2$/g, particularly 0.2 to 1 m$^2$/g, in terms of BET specific surface area.

When 5 g of the positive electrode active material is dissolved in 100 ml of distilled water, the pH of the supernatant liquid is preferably 7 to 12.

Where the positive electrode active material is obtained by calcining, the calcining is preferably carried out at 500 to 1500° C., still preferably 700 to 1200° C., particularly preferably 750 to 1000° C., for a calcining time of 4 to 30 hours, still preferably 6 to 20 hours, particularly preferably 6 to 15 hours.

The electrically conducting agent which can be used in the electrode material mixture is not limited as long as it undergoes no chemical change in an assembled battery. Useful examples of the electrically conducting agents include natural graphite species, such as scaly graphite, flaky graphite, and earthy graphite; artificial graphite species such as those obtained by calcining petroleum coke, coal coke, cellulosic materials, saccharides, mesophase pitch, etc. at high temperature and vapor-phase growth graphite; carbon black species such as acetylene black, furnace black, Ketjen black, channel black, lamp black, and thermal black; carbon materials such as asphalt pitch, coal tar, activated carbon, mesophase pitch, and polyacene; electrically conductive fibers such as metallic fiber; metal powders such as copper, nickel, aluminum, iron and silver; electrically conductive whiskers such as zinc oxide whiskers and potassium titanate whiskers; and electrically conductive metal oxides such as titanium oxide. Carbon black and graphite, particularly tabular graphite having an aspect ratio of 5 or more, are preferred of them. The electrically conducting agent preferably has a particle size of 0.01 to 20 μm, particularly 0.02 to 10 μm. These electrically conducting agents can be used either individually or as a combination of two or more thereof. In particular, a combination of carbon black, e.g., acetylene black, and graphite having a particle size of 1 to 15 μm is preferred.

The electrically conducting agent is preferably used in an amount of 1 to 50% by weight, particularly 2 to 30% by weight, based on the negative or positive electrode material. As carbon black or graphite, it is preferably used in an amount of 3 to 20% by weight based on the negative or positive electrode material.

A binder is used to hold the electrode material mixture. Examples of useful binders include polysaccharides, thermoplastic resins, and polymers having rubbery elasticity. Examples of suitable binders include water-soluble polymers, such as starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinyl phenol, polyvinyl methyl ether, polyvinyl alcohol, polyvinyl pyrrolidone, polyacrylamide, polyhydroxy(meth)acrylates, and styrene-maleic acid copolymers; emulsions (latices) or suspensions of polyvinyl chloride, tetrafluoroethylene, polyvinylidene fluoride, tetrafluoro-ethylene-hexafluoropropylene copolymers, vinylidene fluoridetetrafluoroethylene-hexafluoropropylene copolymers, polyethylene, polypropylene, ethylene-propylene-diene terpolymers (EPDM), sulfonated EPDM, polyvinyl acetal resins, (meth)acrylate copolymers comprising a (meth)acrylic ester unit (e.g., methyl methacrylate or 2-ethylhexyl acrylate), (meth)acrylate-acrylonitrile copolymers, polyvinyl ester copolymers comprising a vinyl ester unit (e.g., vinyl acetate), styrene-butadiene copolymers, acrylonitrile-butadiene copolymers, polybutadiene, neoprene rubber, fluororubbers, polyethylene oxide, polyester polyurethane resins, polyether polyurethane resins, polycarbonate polyurethane resins, polyester resins, phenol resins, and epoxy resins; and mixtures of two or more thereof. Among these, latex of acrylate polymers, carboxymethyl cellulose, polytetrafluoroethylene, and polyvinylidene fluoride are preferred.

The binder is preferably used in the form of a fine particle dispersion in water. The dispersed particles preferably have an average particle size of 0.01 to 5 $\mu$m, particularly 0.05 to 1 $\mu$m. These binders can be used either individually or as a mixture thereof.

The binder is preferably used in a proportion of 1 to 30% by weight, particularly 2 to 10% by weight, based on the electrode material mixture. If used in too small a proportion, the binder has an insufficient cohesive force or insufficient capability of holding the electrode material mixture. Use of too much binder increases the volume of the electrode, resulting in reduction of capacity per unit volume or weight of the electrode.

Any fibrous material that does not undergo chemical change in an assembled battery can be used as a filler. Fibers of polyolefins (e.g., polypropylene or polyethylene), glass or carbon are usually used. While not limiting, the filler is preferably used in an amount of from 0 up to 30% by weight based on the electrode material mixture.

Examples of the ion conducting agent which can be added to the electrode material mixture includes substances well-known as an organic or inorganic solid electrolyte. The details will be furnished later with reference to an electrolytic solution (i.e., a liquid electrode).

The pressure increasing agent which can be added to the electrode material mixture is a compound capable of increasing the internal pressure of a battery, which is typically exemplified with carbonates, such as lithium carbonate.

Current collectors used in the present invention can be foil, expanded metal, punched metal or net. Suitable examples of the materials of a current collector for the positive electrode include aluminum, stainless steel, nickel, titanium, and alloys thereof. Aluminum foil is preferred for the positive electrode. Suitable examples of the materials of a current collector for the negative electrode include copper, stainless steel, nickel, titanium, and alloys thereof. Copper foil is preferred for the negative electrode. The foil as a current collector preferably has a thickness of 7 to 100 $\mu$m, particularly 7 to 50 $\mu$m, especially 7 to 20 $\mu$m. The expanded metal, punched metal or net preferably has a thickness of 7 to 200 $\mu$m, particularly 7 to 150 $\mu$m, especially 7 to 100 $\mu$m. The material of a current collector preferably has a purity of 98% or higher, more preferably 99% or higher, particularly preferably 99.3% or higher.

The surface of a current collector can be washed with an acid, an alkali or an organic solvent.

A composite current collector composed of a resin film as a base and a metal layer deposited on both sides thereof is still preferred for its reduced thickness. Resins having excellent stretchability and heat resistance, such as polyethylene terephthalate, are preferred for this use. Compared with a current collector made solely of metal which is weak against outer force due to lack of elasticity, such a composite current collector is resistant to shocks. More specifically, a composite current collector composed of a base (e.g., a resin film or paper) having coated thereon an electron conducting substance may be used. Examples of useful resin film include fluororesins, polyethylene terephthalate, polycarbonate, polyvinyl chloride, polystyrene, polyethylene, polypropylene, polyimide, polyamide, cellulose derivatives, and polysulfone. Useful examples of the electron conducting substances include carbonaceous materials such as graphite and carbon black; and metal elements such as aluminum, copper, nickel, chromium, iron, molybdenum, gold and silver, and alloys thereof; with metals being preferred. Aluminum, copper, nickel and stainless steel are still preferred. The metal layer may be formed by adhering a metal foil or by deposition such as vacuum deposition.

The positive electrode and negative electrode each preferably have a structure comprising the respective current collector having the respective electrode material mixture applied on both sides thereof. One or more than one layers can be provided per one side of the current collector. Where two or more layers are provided on a side, there may be a plurality of layers containing the positive electrode active material (or negative electrode material) per one side. A preferred multilayer structure is made up of a layer containing the positive electrode active material (or negative electrode material) and a layer containing no positive electrode active material (or negative electrode material). The layer containing no positive electrode active material (or negative electrode material) can be a protective layer protecting the positive electrode active material (or negative electrode material), an intermediate layer separating the layer containing the positive electrode active material (or negative electrode material), an undercoat provided between the current collector and the positive electrode active material (or negative electrode material), and the like. These layers are inclusively designated auxiliary layers.

A protective layer is preferably provided on either one or both of the positive and negative electrodes. In cases where lithium is to be intercalated into the negative electrode material in an assembled battery, it is preferred for the negative electrode to have a protective layer. The protective layer has a single layer or more than one layers, either the same or different. The protective layer may be provided on only one of the electrode material mixture layers formed on both sides of the current collector.

The protective layer is made up of water-insoluble particles, a binder, etc. The binder to be used here can be selected from those useful for formation of the electrode material mixtures. The water-insoluble particles include various electrically conductive particles and organic or inorganic particles having substantially no electrical conductivity as hereinafter described. It is preferred for the water-insoluble particles to have a water solubility of not higher than 100 ppm, still preferably to be insoluble in water.

The content of the water-insoluble particles in the protective layer is preferably 2.5 to 96% by weight, still preferably 5 to 95% by weight, particularly preferably 10 to 93% by weight.

Examples of the water-insoluble conductive particles include particles of metals or metal oxides, metallic fiber, carbon fiber, and particles of carbon, e.g., carbon black or graphite. Among them preferred are those having low reactivity with alkali metals, especially lithium. Metal particles and carbon particles are still preferred. It is preferable that the element constituting the particles has an electrical resistivity of not higher than $5 \times 10^9$ $\Omega$m at 20° C.

The metal preferably includes those having low reactivity to lithium, namely, those hardly forming an alloy with lithium, such as copper, nickel, iron, chromium, molybdenum, titanium, tungsten, and tantalum. The metal particles can be acicular, columnar, tabular or lumpy, preferably with a maximum diameter of 0.02 to 20 $\mu$m, particularly 0.1 to 10 $\mu$m. It is desirable for the metal particles not to be oxidized to an excessive degree on their surface. If they have an oxidized surface, they are preferably heat-treated in an reducing atmosphere.

The carbon particles to be used can be any well-known carbon material that has been used in the art as an electrically conductive material in combination with a non-conductive active material. For example, the above-enumerated conducting agents for use in preparing the electrode material mixture can be employed.

Examples of the water-insoluble particles having substantially no conductivity include particles of Teflon, SiC, aluminum nitride, alumina, zirconia, magnesia, mullite, forsterite, and steatite. These non-conductive particles can be used in combination with the conductive particles. In this case, the former is preferably used in an amount 0.01 to 10 times the amount of the latter.

The positive (or negative) electrode sheet is prepared by applying the positive (or negative) electrode material mixture onto a current collector, drying the mixture, and compressing the mixture.

The electrode material mixture is prepared by mixing the positive electrode active material (or negative electrode material) and an electrically conducting agent, kneading the mixture together with a binder (a suspension or emulsion of a powdered resin) and a dispersing medium, and subsequently dispersing the mixture by means of a stirring mixer or a dispersing machine, such as a mixer, a homogenizer, a dissolver, a planetary mixer, a paint shaker, and a sand mill. Water or an organic solvent is used as a dispersing medium, with water being preferred. If desired, additives, such as a filler, an ion conductive agent, and a pressure increasing agent, can be added here. The resulting dispersion for the negative electrode or the positive electrode preferably has a pH of 5 to 10 or 7 to 12, respectively.

The (pasty) electrode material mixture thus prepared is applied to a current collector by various coating techniques, such as reverse roll coating, direct roll coating, blade coating, knife coating, extrusion coating, slide coating, curtain coating, gravure coating, bar coating, dip coating, and squeeze coating. Extrusion coating or slide coating is preferred. Coating is preferably carried out at a line speed of 0.1 to 100 m/min. Proper selection of a coating technique according to the physical properties and drying properties of the pasty electrode material mixture will assure satisfactory surface conditions of the resulting coated layer. In providing an electrode layer composed of two or more layers, it is preferred that these layers be formed simultaneously from the viewpoint of uniformity of the electrode and the production cost. The thickness, length and width of the coated layer are decided according to the battery size. The thickness of the coated layer after drying and compression is typically from 10 to 1000 $\mu$m per both sides.

The sheet electrode is dried and dehydrated by hot air drying, vacuum drying, infrared drying, far infrared drying, electron beam drying, and low humidity air drying. These drying means can be used either individually or as a combination thereof. The drying temperature preferably ranges from 80° to 350° C., particularly from 100° to 260° C. The drying is preferably conducted until the water content of the electrode material mixture layer is reduced to 2000 ppm or less, particularly to 500 ppm or less.

Compression of the coated layer can be carried out by a generally employed pressing means, preferably by mold pressing or calendering. While not limiting, the pressing pressure is preferably 10 kg/cm$^2$ to 3 t/cm$^2$. The pressing speed in calendering is preferably 0.1 to 50 m/min. The pressing temperature is preferably from room temperature to 200° C.

The separator which can be used in the present invention is made of an insulating material (or film) exhibiting high ion permeability and prescribed mechanical strength. Suitable materials of the separator include olefin polymers, fluororesins, cellulosic polymers, polyimide, nylon, glass fiber, and alumina fiber. Polypropylene, polyethylene, a mixture of polypropylene and polyethylene, a mixture of polypropylene and Teflon, and a mixture of polyethylene and Teflon are preferred. Suitable forms of the separator include nonwoven fabric, woven fabric, and porous film, with porous film being preferred. Porous film having a pore size of 0.01 to 1 $\mu$m and a thickness of 5 to 50 $\mu$m is particularly preferred. The porous film as a separator may be a single layer or a laminate of two or more porous films different in shape or density of pores or material. For example, a composite film composed of a polyethylene film and a polypropylene film can be used.

An electrolytic solution (i.e., a liquid electrolyte) is generally made up of a supporting salt and a solvent. The supporting salt mainly used in lithium secondary batteries is a lithium salt.

Examples of suitable lithium salts include LiClO$_4$, LiBF$_4$, LiPF$_6$, LiCF$_3$CO$_2$, LiAsF$_6$, LiSbF$_6$, LiB$_{10}$Cl$_{10}$, fluorosulfonic acids represented by formula LiOSO$_2$C$_n$F$_{2n+1}$ (n: positive integer of 6 or smaller), imide salts represented by formula LiC(SO$_2$C$_n$F$_{2n+1}$)(SO$_2$C$_m$F$_{2m+1}$) (m, n: positive integer of 6 or smaller), methide salts represented by formula LiN(SO$_2$C$_p$F$_{2p+1}$)(SO$_2$C$_q$F$_{2q+1}$)(SO$_2$C$_r$F$_{2r+1}$) (p, q, r: positive integer of 6 or smaller), lower fatty acid salts of lithium, LiAlCl$_4$, LiCl, LiBr, LiI, chloroboran lithium, and lithium tetraphenylborate. These Li salts can be used individually or as a mixture of two or more thereof. Among these, LiBF$_4$, LiPF$_6$ or a mixture thereof is preferred. While not limiting, these supporting salts are dissolved in a solvent in a concentration of 0.2 to 3 mol per liter of the electrolytic solution.

Useful solvents include aprotic organic solvents, such as propylene carbonate, ethylene carbonate, butylene carbonate, chloroethylene carbonate, trifluoromethylethylene carbonate, difluoromethylethylene carbonate, monofluoromethylethylene carbonate, methyl acetate hexafluoride, methyl acetate trifluoride, dimethyl carbonate, diethyl carbonate, methyl ethyl carbonate, $\gamma$-butyrolactone, methyl formate, methyl acetate, 1,2-dimethoxyethane, tetrahydrofuran, 2-methyl-tetrahydrofuran, dimethyl sulfoxide, 1,3-dioxolane, dioxolane derivatives (e.g., 2,2-bis (trifluoromethyl)-1,3-dioxolane), formamide, dimethylformamide, dioxane, acetonitrile, nitromethane, ethyl monoglyme, phosphoric triesters, boric acid triesters, trimethoxymethane, sulfolane, 3-methyl-2-oxazolidinone, 3-alkylsydnones (the alkyl moiety includes propyl, isopropyl and butyl), propylene carbonate derivatives, tetrahydrofuran derivatives, diethyl ether, and 1,3-propanesultone. They can be used individually or as a mixture of two or more thereof. Preferred of these solvents are carbonate solvents. Mixtures of a cyclic carbonate (e.g., ethylene carbonate and propylene carbonate) and an acyclic carbonate (e.g., diethyl carbonate, dimethyl carbonate, and methyl ethyl carbonate) are still preferred.

An electrolytic solution (i.e., a liquid electrolyte) comprising an appropriately mixed solvent of ethylene carbonate, propylene carbonate, 1,2-dimethoxyethane, dimethyl carbonate, and/or diethyl carbonate having dissolved therein $LiCF_3SO_3$, $LiClO_4$, $LiBF_4$ and/or $LiPF_6$ is preferred. An electrolytic solution comprising a mixed solvent of at least one of propylene carbonate and ethylene carbonate and at least one of dimethyl carbonate and diethyl carbonate, having dissolved therein at least one of $LiCF_3SO_3$, $LiClO_4$ and $LiBF_4$ and $LiPF_6$ is still preferred. The amount of the electrolytic solution to be put in a battery is not particularly limited and is decided appropriately according to the amount of the electrode materials or the size of the battery.

In addition to the electrolytic solution (i.e., the liquid electrolyte), the following solid electrolytes can be used in combination. Solid electrolytes are divided into inorganic ones and organic ones. Examples of well-known inorganic solid electrolytes include lithium nitride, a lithium halide, and a lithium oxyacid salt. Among them, $Li_3N$, $LiI$, $Li_5NI_2$, $Li_3N$—$LiI$—$LiOH$, $Li_4SiO_4$, $Li_4SiO_4$—$LiI$—$LiOH$, $xLi_3PO_4$—$(1-x)Li_4SiO_4$, $Li_2SiS_3$, and phosphorus sulfide compounds are effective.

Examples of effective organic solid electrolytes include polyethylene oxide derivatives or polymers containing the same, polypropylene oxide derivatives or polymers containing the same, polymers containing an ion-dissociation group, a mixture of a polymer containing an ion-dissociation group and the above-mentioned aprotic electrolyte, phosphoric acid ester polymers, and polymeric matrix materials containing an aprotic polar solvent. A method of adding polyacrylonitrile to an electrolytic solution and a method of combining an organic solid electrolyte and an inorganic solid electrolyte are also known.

The electrolyte can contain other compounds for the purpose of improving discharge performance and charge and discharge characteristics. Examples of useful compounds include pyridine, pyrroline, pyrrole, triphenylamine, phenylcarbazole, triethyl phosphite, triethanolamine, a cyclic ether, ethylenediamine, n-glyme, hexaphosphoric acid triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, 2-methoxyethanol, $AlC_3$, a monomer providing a conductive polymer as an electrode active material, triethylenephosphoramide, a trialkylphosphine, morpholine, an aryl compound having a carbonyl group, a crown ether (e.g., 12-crown-4), hexamethylphosphoric triamide and a 4-alkylmorpholine, a bicyclic tertiary amine, a quaternary phosphonium salt, and a tertiary sulfonium salt, with triphenylamine, phenylcarbazole or a mixture thereof being preferred.

In order to make the electrolytic solution incombustible, a halogen-containing solvent, such as carbon tetrachloride or trifluorochloroethylene, may be added to the electrolytic solution. In order to impart suitability to high-temperature storage, carbonic acid gas may be incorporated into the electrolytic solution.

It is preferred that the electrolytic solution be as free as possible from water or free acids. In this regard, the electrolytic solution is preferably prepared from materials having been thoroughly dehydrated and purified, and the preparation is preferably carried out in dry air having a dew point of $-30°$ C. or below or in an inert gas atmosphere. The water content and the free acid content in the electrolytic solution are each 0.1 to 500 ppm, preferably 0.2 to 100 ppm.

The electrolytic solution is poured into a battery case either all at once or in two or more divided portions. In the latter mode of addition, which is preferred to the former, the portions may be the same or different in composition. For example, addition of a nonaqueous solvent (A) or a solution of a lithium salt in the nonaqueous solvent (A) can be followed by addition of a nonaqueous solvent (B) having a higher viscosity than the solvent (A) or a solution of a lithium salt in the nonaqueous solvent (B) having a higher viscosity than the solvent (A). The time required for the addition can be shortened by evacuating the battery case or applying centrifugal force or ultrasonic waves to the battery case.

The battery case (i.e., can) and cap (i.e., lid) are made of nickel-plated steel, stainless steel (SUS304, SUS304L, SUS304N, SUS316, SUS316L, SUS430, SUS444), nickel-plated stainless steel (the above examples apply), aluminum or aluminum alloys, nickel, titanium or copper. Examples of the shape of the battery case includes cylinders with a section of a true circle or an ellipse, prisms with a section of a square or a rectangle. That is, the shape of the battery may be a button, a coin, a sheet or a square (including a rectangle). Where a battery case serves as a negative electrode terminal, it is preferably made of a stainless steel plate or a nickel-plated steel plate. Where a battery case serves as a positive electrode terminal, it is preferably made of a stainless steel plate, an aluminum plate or an aluminum alloy plate.

As a measure against an increase of internal pressure of a battery case, an explosion-proof valve may be used as a sealing top, or a cut may be made in such members as a battery case or a gasket. In addition, various known safety elements may be provided. For example, a fuse, a bimetal, a PTC element, and the like may be provided for prevention of over-current.

A lead plate which can be used in the present invention is made of an electrically conductive metal, such as iron, nickel, titanium, chromium, molybdenum, copper or aluminum, or an alloy thereof. The cap, case, electrode sheets, and lead plate are welded by a well-known technique, such as direct current or alternating current electric welding, laser welding or ultrasonic welding. Conventionally known sealants, such as asphalt, can be used for sealing.

Gaskets made of an olefin polymer, a fluororesin, a cellulosic polymer, polyimide, polyamide, etc. can be used in the battery of the present invention. Gaskets made of an olefin polymer, particularly a propylene polymer (especially a propylene-ethylene block copolymer) are preferred for the resistance to organic solvents and low permeability to moisture.

The battery assembled from the above-described materials and members is preferably subjected to aging treatment including pretreatment, activation, and post-treatment, thereby to ensure a high charge and discharge capacity and excellent cycle properties. The pretreatment is for making the distribution of lithium even in the electrodes, which is accomplished, for example, by an appropriate combination of lithium dissolution control, temperature control for uniform lithium distribution, rocking and/or rotation treatment, and a charge and discharge treatment. The activation treatment is for intercalating lithium into the negative electrode of the battery. In this treatment, lithium is preferably intercalated in an amount of 50 to 120% of the amount of lithium intercalated by a charge in actual use of the battery. The post-treatment is for ensuring the activation treatment and includes a preserving treatment for making the battery reaction uniform and a charge and discharge treatment for inspection, which can be combined arbitrarily.

The pretreatment (i.e., the ageing) before activation is preferably carried out at 30 to 70° C., more preferably 30 to 60° C., particularly preferably 40 to 60° C., for 1 to 20 days with the open circuit voltage of preferably 2.5 to 3.8 V, more preferably 2.5 to 3.5 V, particularly preferably 2.8 to 3.3 V.

The charging voltage for the activation is preferably 4.0 V or higher, still preferably 4.05 to 4.3 V, particularly preferably 4.1 to 4.2 V.

The treatment (i.e., the ageing) after the activation is preferably conducted at 30 to 70° C., particularly 40 to 60° C., for 0.2 to 20 days, particularly 0.5 to 5 days, with the open circuit voltage of 3.9 to 4.3 V, particularly 4.0 to 4.2 V.

If desired, the battery of the invention is covered with a sheathing material, such as a shrinkable tube, an adhesive tape, a metallic film, paper, cloth, paint, and a plastic case. At least part of the sheath may be made of a thermochromic material so that the thermal history during use could be seen.

If desired, a plurality of the batteries can be connected in series and/or parallel to make a pack of batteries. The pack of batteries can have safety elements, such as a PTC element, a temperature fuse, a fuse, and/or a current breaking element, and a safety circuit (a circuit having a function of monitoring the voltage, temperature, current, etc. of the individual batteries and/or the set of the batteries, combined, if desired, with a function for shutting the current flow). The battery pack can also have external terminals in addition to the positive and negative terminals for the battery set, such as positive and negative terminals for the individual batteries, thermal sensor terminals for the battery set and the individual batteries, and a current sensor terminal for the battery set. The battery pack may contain a voltage converting circuit (e.g., a DC—DC convertor). The individual batteries can be connected by welding lead plates or detachably connected by means of sockets. The battery pack may have a function of displaying the residual capacity, necessity of a charge, the number of times of use, and the like.

The secondary battery according to the present invention is useful in a wide variety of equipment. It is particularly suitable to video cameras, portable video tape recorders with a monitor, movie cameras with a monitor, digital cameras, compact cameras, single-lens reflex cameras, film units with a lens, notebook personal computers, notebook word processors, pocket (palm-top) personal computers, mobile phones, wireless phone extensions, electrical shavers, electrical tools, motor mixers, automobiles, and so on.

Specific but non-limiting embodiments of the practice of the present invention are listed below.

(1) A nonaqueous secondary battery comprising a positive electrode having a positive electrode active material, a negative electrode having a negative electrode material, and a nonaqueous electrolyte, wherein the positive electrode active material is a transition metal oxide capable of intercalating and deintercalating lithium, and the negative electrode material comprises at least one silicic material capable of intercalating and deintercalating lithium selected from silicon, a silicon alloy and a silicide.

(2) The nonaqueous secondary battery according to (1), wherein the silicic material has an average particle size of 0.001 to 10 μm.

(3) The nonaqueous secondary battery according to (1), wherein the silicic material has an average particle size of 0.001 to 5 μm.

(4) The nonaqueous secondary battery according to (1), wherein the silicic material has an average particle size of 0.002 to 2 μm.

(5) The nonaqueous secondary battery according to (1), wherein the silicic material is a silicon alloy.

(6) The nonaqueous secondary battery according to (5), wherein at least one of the elements constituting the silicon alloy other than silicon is an alkaline earth metal, a transition metal or a semimetal.

(7) The nonaqueous secondary battery according to (6), wherein at least one of the elements other than silicon which constitute the silicon alloy is Ge, Be, Ag, Al, Au, Cd, Ga, In, Sb, Sn or Zn.

(8) The nonaqueous secondary battery according to (7), wherein the silicon alloy further contains at least one metal selected from the group consisting of Mg, Fe, Ni, Co, Ti, Mo, and W.

(9) The nonaqueous secondary battery according to (8), wherein the at least one metal selected from the group consisting of Mg, Fe, Ni, Co, Ti, Mo and W is contained in an amount of more than 0 to 20% by weight based on silicon.

(10) The nonaqueous secondary battery according to (6), wherein the elements other than silicon are contained in a ratio of 5 to 2000% by weight based on silicon.

(11) The nonaqueous secondary battery according to (5), wherein the silicon alloy is an alloy obtained by calcining.

(12) The nonaqueous secondary battery according to (11), wherein the firing is carried out at a calcining temperature of 1000 to 1800° C.

(13) The nonaqueous secondary battery according to (11), wherein the calcining is followed by cooling at a rate of temperature drop of 10° C./min or higher.

(14) The nonaqueous secondary battery according to (1), wherein the silicic material is silicon obtained by removing metal from a metal silicide.

(15) The nonaqueous secondary battery according to (14), wherein the metal silicide is lithium silicide.

(16) The nonaqueous secondary battery according to (15), wherein the lithium silicide has a lithium content of 100 to 420 mol % based on silicon.

(17) The nonaqueous secondary battery according to (15), wherein the silicic material is silicon obtained by treating the lithium silicide with a dehydrated alcohol to remove lithium.

(18) The nonaqueous secondary battery according to (1), wherein the silicic material has adhered thereto a ceramic that is not reactive with lithium.

(19) The nonaqueous secondary battery according to (18), wherein the ceramic is at least one of $Al_2O_3$, $SiO_2$, $TiO_2$, SiC, and $Si_3N_4$.

(20) The nonaqueous secondary battery according to (19), wherein the ceramic is $SiO_2$.

(21) The nonaqueous secondary battery according to (20), wherein the $SiO_2$ is colloidal $SiO_2$.

(22) The nonaqueous secondary battery according to (18), wherein the ceramic is present in an amount of 2 to 50% by weight based on the silicic material.

(23) The nonaqueous secondary battery according to (18), wherein the silicic material having adhered thereto a ceramic is obtained by a method comprising heating at 300 to 1600° C.

(24) The nonaqueous secondary battery according to (1), wherein the silicic material is coated with at least one metal.

(25) The nonaqueous secondary battery according to (24), wherein the coating of the metal is by at least one method selected from the group consisting of electroless plating, vacuum evaporation, sputtering, chemical vapor-phase deposition and metal pressing methods.

(26) The nonaqueous secondary battery according to (24), wherein the at least one metal is at least one metal selected from the group consisting of Ni, Cu, Ag, Co, Fe, Cr, W, Ti, Au, Pt, Pd, Sn, and Zn.

(27) The nonaqueous secondary battery according to (26), wherein the at least one metal is at least one of Ni, Cu, and Ag.

(28) The nonaqueous secondary battery according to (24), wherein a specific conductivity of the metal-coated silicic material is 3 or more times that of the silicic material uncoated.

(29) The nonaqueous secondary battery according to (24), wherein the amount of the coating metal ranges from 1 to 80% by weight based on silicon of the silicic material.

(30) The nonaqueous secondary battery according to (1), wherein the silicic material is partially coated with a thermoplastic resin.

(31) The nonaqueous secondary battery according to (30), wherein the coating of the thermoplastic resin is applied with the silicic material prepared by a method comprising dissolving or dispersing the thermoplastic resin in a solvent, mixing the silicic material into the resin solution or dispersion, and kneading the mixture.

(32) The nonaqueous secondary battery according to (30), wherein the thermoplastic resin is at least one selected from the group consisting of polyvinylidene fluoride and polytetrafluoroethylene.

(33) The nonaqueous secondary battery according to (30), wherein the thermoplastic resin is present in an amount of 2 to 30% by weight based on the silicic material.

(34) The nonaqueous secondary battery according to (30), wherein the coating area ratio is 5 to 95%.

(35) The nonaqueous secondary battery according to (1), wherein the negative electrode material further comprises 5 to 1900% by weight of carbon based on the silicic material.

(36) The nonaqueous secondary battery according to (35), wherein the carbon is present in an amount of 30 to 400% by weight based on the silicic material.

(37) The nonaqueous secondary battery according to (35), wherein the carbon is flaky natural graphite.

(38) The nonaqueous secondary battery according to (1), wherein the degree of charging and discharging the silicic material in terms of the atomic ratio of intercalated and deintercalated lithium to silicon, being expressed by x in $Li_xSi$, ranges from 0 to 4.2.

(39) The nonaqueous secondary battery according to (1), wherein the degree of charging and discharging the silicic material in terms of the atomic ratio of intercalated and deintercalated lithium to silicon, being expressed by x in $Li_xSi$, ranges from 0 to 3.7.

(40) The nonaqueous secondary battery according to (1), wherein charging the silicic material is stopped while the charging current falls within a range of from 0.1 to 10% of a 1-hour charging rate.

(41) The nonaqueous secondary battery according to (40), wherein the time of charging is 15 minutes to 10 hours.

(42) The nonaqueous secondary battery according to (1), wherein the positive electrode active material is at least one of a compound represented by formula $Li_xMO_2$ (wherein M is at least one of Co, Ni, Fe, and Mn; and x is from 0 to 1.2) and a compound having a spinel structure represented by formula $Li_yMn_2O_4$ (wherein y is from 0 to 2).

(43) The nonaqueous secondary battery according to (1), wherein the positive electrode active material is at least one of a compound represented by formula $Li_yM_aD_{1-a}O_2$ (wherein M is at least one of Co, Ni, Fe, and Mn; D is at least one metal different from M and is at least one selected from the group consisting of Co, Ni, Fe, Mn, Al, Zn, Cu, Mo, Ag, W, Ga, In, Sn, Pb, Sb, Sr, B, and P; y=0 to 1.2; and a=0.5 to 1) and a compound having a spinel structure represented by formula $Li_z(Mn_bE_{1-b})_2O_4$ (wherein E is at least one of Co, Ni, Fe, Al, Zn, Cu, Mo, Ag, W, Ga, In, Sn, Pb, Sb, Sr, B, and P; b=1 to 0.2; z=0 to 2).

(44) The nonaqueous secondary battery according to (1), wherein the negative electrode has a rate of expansion of 1.05 to 3.0 on lithium intercalation.

(45) The nonaqueous secondary battery according to (44), wherein the negative electrode has a rate of expansion of 1.05 to 2.0 on lithium intercalation.

(46) The nonaqueous secondary battery according to (44), wherein the negative electrode has a rate of expansion of 1.05 to 1.5 on lithium intercalation.

(47) The nonaqueous secondary battery according to (44), wherein the negative electrode has a rate of expansion of 1.05 to 1.2 on lithium intercalation.

(48) The nonaqueous secondary battery according to (5), wherein the silicon alloy has adhered with a ceramic that is not reactive with lithium.

(49) The nonaqueous secondary battery according to (5), wherein the silicon alloy is coated with at least one metal.

(50) The nonaqueous secondary battery according to (48), wherein the silicon alloy is coated with at least one metal.

(51) The nonaqueous secondary battery according to (49), wherein the silicon alloy has adhered thereto a ceramic that is not reactive with lithium.

(52) The nonaqueous secondary battery according to (5), wherein the silicon alloy is partially coated with a thermoplastic resin.

(53) The nonaqueous secondary battery according to (52), wherein the material is coated with at least one metal.

(54) The nonaqueous secondary battery according to (48), wherein the material is coated with a thermoplastic resin in accordance with (30).

(55) The nonaqueous secondary battery according to (48), wherein the material is coated with a thermoplastic resin in accordance with (30) and then coated with at least one metal.

(56) The nonaqueous secondary battery according to (5), wherein the negative electrode material further comprises 5 to 1900% by weight of carbon based on the silicon alloy.

(57) The nonaqueous secondary battery according to (48), wherein the negative electrode material further comprises 5 to 1900% by weight of carbon based on the silicon alloy.

(58) The nonaqueous secondary battery according to (5), wherein the degree of charging and discharging the silicic material in terms of the atomic ratio of intercalated and deintercalated lithium to silicon, being expressed by x in $Li_xSi$, ranges from 0 to 4.2.

(59) The nonaqueous secondary battery according to (48), wherein the degree of charging and discharging the silicic material in terms of the atomic ratio of intercalated and deintercalated lithium to silicon, being expressed by x in $Li_xSi$, ranges from 0 to 4.2.

(60) The nonaqueous secondary battery according to (1), wherein the silicic material is a silicon alloy, and the positive electrode active material is at least one of the compounds described in (42) or (43).

(61) The nonaqueous secondary battery according to (1), wherein the silicic material has an average particle size of 0.001 to 5 $\mu$m, and the positive electrode active material is at least one of the compounds described in (42) or (43).

(62) The nonaqueous secondary battery according to (14), wherein the silicon has adhered thereto the ceramic described in (18) or (19).

(63) The nonaqueous secondary battery according to (14), wherein the silicon is coated with a metal according to (24) or (26).

(64) The nonaqueous secondary battery according to (62), wherein the material is coated with a metal according to (24) or (26).

(65) The nonaqueous secondary battery according to (63), wherein the material has adhered thereto the ceramic of (18) or (19).

(66) The nonaqueous secondary battery according to (14), wherein the silicon is partially coated with a thermoplastic resin according to (30) or (32).

(67) The nonaqueous secondary battery according to (66), wherein the material is coated with a metal according to (24) or (26).

(68) The nonaqueous secondary battery according to (62), wherein the material is coated with a thermoplastic resin in accordance with (30) or (32).

(69) The nonaqueous secondary battery according to (62), wherein the material is coated with a thermoplastic resin in accordance with (30) or (32) and then coated with a metal in accordance with (23) or (25).

(70) The nonaqueous secondary battery according to (14), wherein the negative electrode material further comprises carbon in accordance with (35) or (37).

(71) The nonaqueous secondary battery according to (62), wherein the negative electrode material further comprises carbon in accordance with (35) or (37).

(72) The nonaqueous secondary battery according to (14), wherein the degree of charging and discharging the negative electrode material is in accordance with (38) or (39).

(73) The nonaqueous secondary battery according to (62), wherein the degree of charging and discharging the negative electrode material is in accordance with (38) or (39).

(74) The nonaqueous secondary battery according to (1), wherein the silicic material is silicon obtained by removing metal from a metal silicide, and the positive electrode active material is the compound according to (42) or the compound according to (43).

(75) The nonaqueous secondary battery according to (1), wherein the negative electrode material is the ceramic-adhered silicon according to (62), and the positive electrode active material is the compound according to (42) or the compound according to (43).

(76) The nonaqueous secondary battery according to (18), wherein the silicic material is coated with a metal in accordance with (24) or (26).

(77) The nonaqueous secondary battery according to (18), wherein the silicic material is coated with a thermoplastic resin in accordance with (30) or (32).

(78) The nonaqueous secondary battery according to (76), wherein the material is with a thermoplastic resin in accordance with (30) or (32).

(79) The nonaqueous secondary battery according to (78), wherein the material is coated with a metal according to (24) or (26).

(80) A nonaqueous secondary battery according to (18), wherein the negative electrode material further comprises carbon in accordance with (35) or (36).

(81) The nonaqueous secondary battery according to (76), wherein the negative electrode material further comprises carbon in accordance with (35) or (37).

(82) The nonaqueous secondary battery according to (18), wherein the degree of charging and discharging the silicic material is in accordance with (38) or (39).

(83) The nonaqueous secondary battery according to (76), wherein the degree of charging and discharging the silicic material is in accordance with (38) or (39).

(84) The nonaqueous secondary battery according to (1), wherein the silicic material has adhered thereto a ceramic that is not reactive with lithium, and the positive electrode active material is the compound according to (42) or the compound according to (43).

(85) The nonaqueous secondary battery according to (1), wherein the silicic material is the silicic material according to (76), and the positive electrode active material is the compound according to (42) or the compound according to (43).

(86) The nonaqueous secondary battery according to (24), wherein the material has adhered thereto the ceramic of (18) or (19).

(87) The nonaqueous secondary battery according to (24), wherein the material is coated with a thermoplastic resin in accordance with (30) or (32).

(88) The nonaqueous secondary battery according to (86), wherein the material is coated with a thermoplastic resin in accordance with (30) or (32).

(89) The nonaqueous secondary battery according to (24), wherein the negative electrode material further comprises carbon in accordance with (35) or (37).

(90) The nonaqueous secondary battery according to (86), wherein the negative electrode material further comprises carbon in accordance with (35) or (37).

(91) The nonaqueous secondary battery according to (24), wherein the negative electrode material further comprises carbon in accordance with (35) or (37).

(92) The nonaqueous secondary battery according to (24), wherein the degree of charging and discharging the negative electrode material is in accordance with (38) or (39).

(93) The nonaqueous secondary battery according to (86), wherein the degree of charging and discharging the negative electrode material is in accordance with (38) or (39).

(94) The nonaqueous secondary battery according to (1), wherein the silicic material is the material described in (24), and the positive electrode active material is the compound according to (42) or the compound according to (43).

(95) The nonaqueous secondary battery according to (1), wherein the silicic material is the material described in (84), and the positive electrode active material is the compound according to (42) or the compound according to (43).

(96) The nonaqueous secondary battery according to (30), wherein the material has adhered thereto the ceramic of (18) or (19).

(97) The nonaqueous secondary battery according to (30), wherein the material is coated with a metal in accordance with (24) or (26).

(98) The nonaqueous secondary battery according to (96), wherein the material is coated with a metal in accordance with (24) or (26).

(99) The nonaqueous secondary battery according to (30), wherein the negative electrode material further comprises carbon in accordance with (35) or (36).

(100) The nonaqueous secondary battery according to (96), wherein the negative electrode material further comprises carbon in accordance with (35) or (37).

(101) The nonaqueous secondary battery according to (97), wherein the negative electrode material further comprises carbon in accordance with (35) or (37).

(102) The nonaqueous secondary battery according to (30), wherein the degree of charging and discharging the negative electrode material is in accordance with (38) or (39).

(103) The nonaqueous secondary battery according to (96), wherein the degree of charging and discharging the negative electrode material is in accordance with (38) or (39).

(104) The nonaqueous secondary battery according to (1), wherein the silicic material is the material according to (30), and the positive electrode active material is the compound according to (42) or the compound according to (43).

(105) The nonaqueous secondary battery according to (1), wherein the silicic material is the material according to (96), and the positive electrode active material is the compound according to (42) or the compound according to (43).

(106) The nonaqueous secondary battery according to (1), wherein the negative electrode material is the material of (35), and the positive electrode active material is the compound according to (42) or the compound according to (43).

(107) The nonaqueous secondary battery according to (35), wherein the degree of charging and discharging of the negative electrode material is in accordance with (38) or (39).

(108) The nonaqueous secondary battery according to (3), wherein the degree of charging and discharging the silicic material is in accordance with (38) or (39).

EXAMPLE

The present invention will now be illustrated in greater detail with Examples, but it should be understood that the present invention is not limited thereto. Unless otherwise noted, all the percents are by weight.

EXAMPLE I-1

Preparation of Positive Electrode Paste:

LiCoO$_2$ (200 g) as a positive electrode active material was mixed with 10 g of acetylene black in a homogenizer. Five grams of polyvinylidene fluoride (hereinafter abbreviated as PVF) was mixed as a binder, and 500 ml of N-methyl-2-pyrrolidone was added thereto, followed by kneading to prepare a paste for a positive electrode.

Preparation of Negative Electrode Paste:

Each of the negative electrode materials (I-1 to I-36) listed below and an equal weight of flaky natural graphite were thoroughly mixed, and 190 g of the resulting mixed powder and 10 g of PVF (binder) were dispersed in 500 ml of N-methyl-2-pyrrolidone to prepare a paste for a negative electrode. All the negative electrode materials used had an average particle size of 0.05 to 4 μm.

Negative Electrode Materials:

I-1: Polycrystalline silicon (single substance)

Metallurgically synthesized alloys I-2 to I-13 (the ratios in the parentheses are atomic ratios):

I-2: Si—Ag alloy (60:40)
I-3: Si—Ag alloy (80:20)
I-4: Si—Ag alloy (30–70)
I-5: Si—Al alloy (60:40)
I-6: Si—Ag—Cd alloy (60:30:10)
I-7: Si—Zn alloy (60:40)
I-8: Si—Au alloy (60:40)
I-9: Si—Ag—In alloy (60:30:10)
I-10: Si—Ge alloy (60:40)
I-11: Si—Ag—Sn alloy (60:30:10)
I-12: Si—Ag—Sb alloy (60:30:10)
I-13: Si—Ag—Ni alloy (60:30:10)
I-14: Silicon prepared by removing 100% of Li from the metallurgically synthesized Li$_4$Si by elution in isopropyl alcohol, and grinding the resulting silicon in argon gas.
I-15: Si—SiO$_2$ (weight ratio: 80:20) prepared by mixing the silicon as negative electrode material I-1 and colloidal silica, heating the mixture at 1000° C., and grinding the resulting solid in a vibration mill in an argon gas atmosphere.
I-16: Si—SiO$_2$ (weight ratio: 90:10) prepared in the same manner as for negative electrode material I-15.
I-17: Si—SiO$_2$ (weight ratio: 60:40) prepared in the same manner as for negative electrode material I-15.
I-18: Si—Al$_2$O$_3$ (weight ratio: 90:10) prepared in the same manner as for negative electrode material I-15, except for using alumina sol in place of colloidal silica.
I-19: (I-2)-SiO$_2$ (weight ratio: 90:10) prepared by adhering SiO$_2$ to negative electrode material I-2 in the same manner as for I-16.
I-20: Ag-plated Si (Si:Ag atomic ratio=60:40) prepared by plating the surface of I-1 with Ag by electroless plating using dextrin as a reducing agent and AgNO$_3$ as an Ag source.
I-21: Ni-plated Si (Si:Ni atomic ratio=60:40) prepared in the same manner as for I-20, except for using NaH$_2$PO$_2$ as a reducing agent and NiSO$_4$ as an Ni source.
I-22: Ni-plated Si (Si:Ni atomic ratio=80:20) prepared in the same manner as for I-21.
I-23: Ni-plated Si (Si:Ni atomic ratio=30:70) prepared in the same manner as for I-21.
I-24: Zn-plated Si (Si:Zn atomic ratio=60:40) prepared in the same manner as for I-20, except for using NaBH$_4$ as a reducing agent and ZnO as a Zn source.
I-25: Ni-plated I-2 (I-2:Ni weight ratio=80:20) prepared by plating negative electrode material I-2 with Ni by electroless plating.
I-26: PVF-coated Si prepared by kneading 30 g of negative electrode material I-1 in a solution of 3 g of PVF in 50 g of N-methylpyrrolidone, drying the mixture, and grinding the resulting solid in an automatic mortar.
I-27: PVF-coated I-2 (I-2:PVF weight ratio=90:10) prepared in the same manner as for I-26, except for using negative electrode material I-2 in place of negative electrode material I-1.
I-28: Ag-plated Si (Si:Ag atomic ratio=60:40) prepared by plating negative electrode material I-14 with Ag by electroless plating.
I-29: Ni-plated Si (Si:Ni atomic ratio=60:40) prepared in the same manner as for I-28, except for using Ni in place of Ag.
I-30: PVF-coated Si (Si:PVF weight ratio=90:10) prepared in the same manner as for negative electrode material I-26, except for using negative electrode material I-14 in place of negative electrode material I-1.
I-31: Ni-plated I-30 (I-30:Ni weight ratio=70:30) prepared by plating negative electrode material I-30 with Ni by electroless plating.
I-32: Ag-plated I-15 (I-15:Ag weight ratio=70:30) prepared by plating negative electrode material I-15 with Ag by electroless plating.

I-33: Ni-plated I-15 (I-15:Ni weight ratio=70:30) prepared by plating negative electrode material I-15 with Ni by electroless plating.

I-34: PVF-coated I-15 (I-15:PVF weight ratio=90:10) prepared in the same manner as for negative electrode material I-26, except for using negative electrode material I-15 in place of negative electrode material I-1.

I-35: Ag-plated I-34 (I-34:Ag weight ratio=80:20) prepared by coating negative electrode material I-34 with Ag by electroless plating.

I-36: Ni-plated I-34 (I-34:Ni weight ratio=80:20) prepared in the same manner as for I-35 except for using Ni in place of Ag.

Preparation of Electrode Sheets:

The positive electrode paste was applied to both sides of a 30 μm thick aluminum foil current collector by means of a blade coater, dried at 150° C., and compression molded by a roller press to obtain a sheet. The sheet was cut into a band of prescribed size, and thoroughly dehydrated by heating with a far infrared heater in a dry box (dry air having a dew point of −50° C. or lower) to prepare a positive electrode sheet.

In the same manner, the negative electrode paste was applied to both sides of a 20 μm thick copper foil current collector and treated to prepare a negative electrode sheet.

The coating weights of the positive electrode paste and the negative electrode paste were adjusted so that the 1st cycle charging capacity at which the positive electrode active material reached 4.2 V with respect to metallic lithium and the 1st cycle charging capacity at which the negative electrode material became 0.0 V were in agreement with each other.

Preparation of Electrolytic Solution:

In an argon atmosphere 65.3 g of diethyl carbonate was put in a 200 ml narrow-necked polypropylene container, and 22.2 g of ethylene carbonate was dissolved therein in small portions taking care that the liquid temperature did not exceed 30° C. Then 0.4 g of $LiBF_4$ and 12.1 g of $LiPF_6$ were gradually dissolved therein in this order taking care that the liquid temperature did not exceed 30° C. The resulting electrolytic solution was a colorless clear liquid having a specific gravity of 1.135, a water content of 18 ppm as measured with a Karl Fischer's titration apparatus (Model MKC-210 manufactured by Kyoto Denshi K.K.), and a free acid content of 24 ppm as measured by neutralization titration using Bromothymol Blue as an neutralization indicator and a 0.1N NaOH aqueous solution.

Preparation of Cylinder Battery:

Cylinder batteries having the structure shown in FIG. 1 were prepared as follows. The positive electrode sheet with a positive electrode lead (4), a finely porous polyethylene film separator, the negative electrode sheet, and the separator were put one on top of another in the order described and rolled up into a cylinder. The electrode group (rolled up) (2) was put in a closed-end battery case (1) made of a nickel-plated iron plate which also served as a negative electrode terminal. An upper insulating plate (3) was inserted therein. The electrolytic solution was poured into the case. A unit composed of a positive electrode terminal (6), an insulating ring, a PTC element (63), a current breaking element (62), and a pressure-sensitive valve (61) was cramped to the open top of the case via a gasket (5) to prepare a cylindrical battery.

The resulting battery was charged at a constant current of 1.5 A until the voltage reached 4.2 V and then at a current controlled so as to maintain the voltage constant at 4.2 V until a 2.5 hour period passed from the start of charging. The charged battery was then discharged to 3.0 V at a constant current of 0.2 C. The discharge capacity, the average discharge voltage, the energy quantity (discharge capacity × average discharge voltage) of the 1st cycle, and the capacity retention (%) in the 30th cycle (cycle life) after the charging and discharging were repeated, are shown in Table 1 below.

TABLE 1

| Sample No. | Negative Electrode Material | Discharge Capacity (mAh) | Average Discharge Voltage (V) | Energy Quantity (Wh) | Cycle life (%) |
| --- | --- | --- | --- | --- | --- |
| I-1 | I-1 | 2300 | 3.5 | 8.0 | 70 |
| I-2 | I-2 | 2000 | 3.5 | 7.0 | 82 |
| I-3 | I-3 | 2100 | 3.5 | 7.3 | 80 |
| I-4 | I-4 | 1800 | 3.5 | 6.3 | 83 |
| I-5 | I-5 | 2000 | 3.5 | 7.0 | 79 |
| I-6 | I-6 | 2000 | 3.5 | 7.0 | 84 |
| I-7 | I-7 | 2000 | 3.5 | 7.0 | 83 |
| I-8 | I-8 | 1900 | 3.5 | 6.6 | 81 |
| I-9 | I-9 | 2000 | 3.5 | 7.0 | 82 |
| I-10 | I-10 | 2000 | 3.5 | 7.0 | 83 |
| I-11 | I-11 | 2200 | 3.5 | 7.6 | 81 |
| I-12 | I-12 | 2000 | 3.5 | 7.0 | 81 |
| I-13 | I-13 | 2000 | 3.5 | 7.0 | 81 |
| I-14 | I-14 | 2300 | 3.5 | 8.0 | 78 |
| I-15 | I-15 | 2200 | 3.5 | 7.6 | 85 |
| I-16 | I-16 | 2200 | 3.5 | 7.6 | 84 |
| I-17 | I-17 | 2100 | 3.5 | 7.3 | 83 |
| I-18 | I-18 | 2000 | 3.5 | 7.0 | 75 |
| I-19 | I-19 | 2000 | 3.5 | 7.0 | 86 |
| I-20 | I-20 | 2100 | 3.5 | 7.3 | 80 |
| I-21 | I-21 | 2100 | 3.5 | 7.3 | 84 |
| I-22 | I-22 | 2200 | 3.5 | 7.6 | 81 |
| I-23 | I-23 | 1800 | 3.5 | 6.3 | 86 |
| I-24 | I-24 | 2000 | 3.5 | 7.0 | 81 |
| I-25 | I-25 | 2000 | 3.5 | 7.0 | 85 |
| I-26 | I-26 | 2200 | 3.5 | 7.6 | 82 |
| I-27 | I-27 | 2100 | 3.5 | 7.3 | 83 |
| I-28 | I-28 | 2000 | 3.5 | 7.0 | 83 |
| I-29 | I-29 | 2000 | 3.5 | 7.0 | 85 |
| I-30 | I-30 | 2200 | 3.5 | 7.3 | 84 |
| I-31 | I-31 | 2000 | 3.5 | 7.0 | 86 |
| I-32 | I-32 | 2000 | 3.5 | 7.0 | 87 |
| I-33 | I-33 | 2200 | 3.5 | 7.6 | 85 |
| I-34 | I-34 | 2000 | 3.5 | 7.0 | 86 |
| I-35 | I-35 | 2000 | 3.5 | 7.0 | 87 |
| I-36 | I-36 | 2000 | 3.5 | 7.0 | 89 |

EXAMPLE I-2

Batteries were prepared in the same manner as in Example I-1 using the negative electrode materials shown in Table 2 below, except that the coating weights of the positive electrode paste and the negative electrode paste were adjusted so that the 1st cycle charge capacity at which the positive electrode active material reaches 4.2 V with respect to metallic lithium agrees with the 1st cycle charge capacity at which the negative electrode material becomes 0.1 V. The charge and discharge test was carried out under the same conditions as in Example I-1, except that the final charge voltage was 4.1 V. The amount of lithium intercalated into siicon was about 3.2 moles (x in $Li_xSi$ was about 3.2).

TABLE 2

| Sample No. | Negative Electrode Material | Discharge Capacity (mAh) | Average Discharge Voltage (V) | Energy Quantity (Wh) | Cycle life (%) |
| --- | --- | --- | --- | --- | --- |
| I-37 | I-1 | 1700 | 3.6 | 6.1 | 78 |
| I-38 | I-2 | 1600 | 3.6 | 5.7 | 85 |
| I-39 | I-14 | 1600 | 3.6 | 5.7 | 83 |

TABLE 2-continued

| Sample No. | Negative Electrode Material | Discharge Capacity (mAh) | Average Discharge Voltage (V) | Energy Quantity (Wh) | Cycle life (%) |
|---|---|---|---|---|---|
| I-40 | I-15 | 1600 | 3.6 | 5.7 | 90 |
| I-41 | I-19 | 1600 | 3.6 | 5.7 | 89 |
| I-42 | I-21 | 1700 | 3.6 | 6.1 | 86 |
| I-43 | I-26 | 1600 | 3.6 | 5.7 | 87 |
| I-44 | I-29 | 1600 | 3.6 | 5.7 | 89 |
| I-45 | I-32 | 1600 | 3.6 | 5.7 | 91 |
| I-46 | I-34 | 1600 | 3.6 | 5.7 | 90 |
| I-47 | I-36 | 1600 | 3.6 | 5.7 | 92 |

EXAMPLE I-3

Batteries were prepared in the same manner as in Example I-1 using the negative electrode materials shown in Table 3 below, except for changing the weight ratio of the negative electrode material to graphite (electrical conducting agent) to 80:20.

TABLE 3

| Sample No. | Negative Electrode Material | Discharge Capacity (mAh) | Avg. Discharge Voltage (V) | Energy Quantity (Wh) | Cycle life (%) |
|---|---|---|---|---|---|
| I-48 | I-1 | 2300 | 3.5 | 8.0 | 65 |
| I-49 | I-2 | 2200 | 3.5 | 7.6 | 81 |
| I-50 | I-14 | 2300 | 3.5 | 8.0 | 73 |
| I-51 | I-15 | 2300 | 3.5 | 8.0 | 80 |
| I-52 | I-19 | 2200 | 3.5 | 7.6 | 85 |
| I-53 | I-21 | 2200 | 3.5 | 7.6 | 83 |
| I-54 | I-26 | 2300 | 3.5 | 8.0 | 78 |
| I-55 | I-29 | 2100 | 3.5 | 7.3 | 84 |
| I-56 | I-32 | 2100 | 3.5 | 7.3 | 86 |
| I-57 | I-34 | 2100 | 3.5 | 7.3 | 85 |
| I-58 | I-36 | 2100 | 3.5 | 7.3 | 88 |

EXAMPLE I-4

Batteries were prepared in the same manner as in Example I-1 using the negative electrode materials shown in Table 4 below, except that the positive and negative electrode pastes were prepared by using water as a dispersing medium in place of N-methylpyrrolidone as follows.

The negative electrode material was mixed with 95% by weight of flaky graphite, 4% by weight of an aqueous dispersion of PVF and 1% of carboxymethyl cellulose. The mixture was kneaded with water in a homogenizer at 10000 rpm for 10 minutes or longer to prepare a slurry. The slurry was applied to both sides of a 18 μm thick copper foil to prepare a negative electrode sheet. A mixture consisting of 90% by weight of LiCoO$_2$, 6% by weight of acetylene black, 3% by weight of an aqueous dispersion of PVF, and 1% by weight of sodium polyacrylate was kneaded with water, and the resulting slurry was applied to both sides of a 30 μm thick aluminum foil to prepare a positive electrode sheet.

A 1:4 (by weight) mixture of flaky graphite and aluminum oxide (average particle size: 2 μm) was applied to the surface of the negative electrode sheet to form a protective layer having an average thickness of 5 μm.

The resulting batteries were tested in the same manner as in Example I-1.

TABLE 4

| Sample No. | Negative Electrode Material | Discharge Capacity (mAh) | Average Discharge Voltage (V) | Energy Quantity (Wh) | Cycle life (%) |
|---|---|---|---|---|---|
| I-59 | I-1 | 2300 | 3.5 | 8.0 | 71 |
| I-60 | I-2 | 2000 | 3.5 | 7.0 | 82 |
| I-61 | I-14 | 2300 | 3.5 | 8.0 | 79 |
| I-62 | I-15 | 2200 | 3.5 | 7.6 | 87 |
| I-63 | I-19 | 2000 | 3.5 | 7.0 | 86 |
| I-64 | I-21 | 2100 | 3.5 | 7.3 | 85 |
| I-65 | I-26 | 2200 | 3.5 | 7.6 | 82 |
| I-66 | I-29 | 2000 | 3.5 | 7.0 | 85 |
| I-67 | I-32 | 2000 | 3.5 | 7.0 | 87 |
| I-68 | I-34 | 2000 | 3.5 | 7.0 | 87 |
| I-69 | I-36 | 2000 | 3.5 | 7.0 | 90 |

COMPARITIVE EXAMPLE I-1

Batteries were prepared in the same manner as in Example I-1 except for using polycrystalline silicon having an average particle size of 70 μm as a negative electrode material. The batteries were tested in the same manner as in Example I-1 (sample No. 1A) and Example I-2 (sample No. 1B). The results obtained are shown in Table 5 below.

COMPARITIVE EXAMPLE I-2

Batteries were prepared in the same manner as in Example I-1 except for using polycrystalline silicon having an average particle size of 2 μm as a negative electrode material and mixing the silicon and flaky graphite at a weight ratio of 96:4. The batteries were tested in the same manner as in Example I-1 (sample No. 2A) and Example I-2 (sample No. 2B). The results obtained are shown in Table 5 below.

COMPARITIVE EXAMPLE I-3

A battery was prepared in the same manner as in Example I-1 except for using mesophase pitch coke as a negative electrode material and adding 2% by weight of acetylene black as an electrical conducting aid. The battery (sample No. 3A) was tested in the same manner as in Example I-1. The results obtained are shown in Table 5.

TABLE 5

| Sample No. | Discharge Capacity (mAh) | Average Discharge Voltage (V) | Energy Quantity (Wh) | Cycle Life (%) |
|---|---|---|---|---|
| 1A | 2000 | 3.5 | 7.0 | 60 |
| 1B | 1800 | 3.6 | 6.4 | 65 |
| 2A | 2400 | 3.4 | 8.2 | 40 |
| 2B | 2200 | 3.6 | 7.9 | 45 |
| 3A | 1400 | 3.7 | 5.0 | 92 |

Comparison between samples of Example I-1 with samples 1A and 1B of Comparative Example I-1 proves that the silicic materials having a smaller particle size of the present invention are excellent in battery cycle life. Comparison among the samples of Example I-1 reveals that silicon alloys, silicon obtained by removing lithium from lithium silicide, colloidal silica-adhered silicon, metal-plated silicon, PVF-coated silicon, and silicic materials having been subjected to a combination of treatments exhibits an improved cycle life as compared with untreated silicon itself and that the treatments produce greater improvement in cycle life when combined than adopted individually.

In Example I-2 where the amount of lithium intercalated into silicon is reduced, the discharge capacity decreases, but the average discharge voltage increases, resulting in an improved cycle life. It is seen from the results of Example I-3 that silicic materials combined with carbon bring about a greater discharge capacity while being substantially equal in cycle life to Example I-1. Example I-4 proves that the aqueous coating system is substantially equal in battery performance to the nonaqueous solvent coating system. As is apparent from Comparative Example I-3, the silicic materials of the present invention have a higher discharge capacity and a higher energy quantity than carbonaceous materials.

The same results were obtained when $LiNiO_2$ or $LiMn_2O_4$ was used in place of $LiCoO_2$ as a positive electrode active material.

EXAMPLE II-1

Preparation of Positive Electrode Paste:

$LiCoO_2$ (200 g) as a positive electrode active material, 10 g of acetylene black, and 10 g of artificial flaky graphite were mixed in a homogenizer. Five grams of PVF was mixed as a binder, and 500 ml of N-methyl-2-pyrrolidone was added thereto, followed by kneading to prepare a paste for a positive electrode material mixture.

Preparation of Negative Electrode Paste:

Each of the negative electrode materials (II-1a to II-20) described below and flaky natural graphite were mixed at a mixing weight ratio of 40:60, and 170 g of the resulting mixed powder and 30 g of PVF were dispersed in 500 ml of N-methyl-2-pyrrolidone to prepare a paste for a negative electrode. All the negative electrode materials used had an average particle size of 0.01 to 1 µm.

Negative Electrode Material:

II-1a: Polycrystalline silicon (average particle size: 0.6 µm)

II-1b: Polycrystalline silicon (average particle size: 0.01 µm)

Metallurgically synthesized silicon alloys II-2 to II-10 (the ratios in the parentheses are weight ratios):

II-2: Si—Ag alloy (20:80)

II-3: Si—Al alloy (30:70)

II-4: Si—Ag—Cd alloy (20:70:10)

II-5: Si—Zn alloy (30:70)

II-6: Si—Au alloy (20:80)

II-7: Si—Ag—In alloy (20:70:10)

II-8: Si—Ge alloy (40:60)

II-9: Si—Ag—Sn alloy (20:70:10)

II-10: Si—Ag—Sb alloy (20:70:10)

II-11: Silicon prepared by removing Li from the metallurgically synthesized $Li_4Si$ by elution in isopropyl alcohol, and grinding the resulting silicon in argon gas.

II-12: Si—$SiO_2$ (weight ratio: 80:20) prepared by mixing polycrystalline silicon and colloidal silica, heating the mixture at 900° C., and grinding the resulting solid in a vibration mill in an argon gas atmosphere.

II-13: Si—$Al_2O_3$ (weight ratio: 80:20) prepared in the same manner as for II-12, except for using alumina sol in place of colloidal silica.

II-14: Ag-plated Si (Si:Ag weight ratio=55:45) prepared by plating the surface of polycrystalline silicon particles with Ag by electroless plating.

II-15: Ni-plated Si (Si:Ni weight ratio=55:45) prepared in the same manner as for II-14, except for plating the surface of polycrystalline silicon particles with Ag.

II-16: Zn-plated Si (Si:Zn weight ratio=55:45) prepared in the same manner as for II-14, except for plating the surface of polycrystalline silicon particles with Zn.

II-17: PVF-coated Si prepared by adding 30 g of silicon into a solution of 3 g of PVF in 20 g of N-methylpyrrolidone, kneading and then drying the mixture, and grinding the solid in a vibration mill in an argon gas atmosphere.

II-18: Ag-plated Si (Si:Ag weight ratio=55:45) prepared by plating II-11 (silicon) with Ag by electroless plating.

II-19: Ag-plated Si—$SiO_2$ (Si:$SiO_2$:Ag weight ratio= 50:10:40) prepared by plating II-12 (Si—$SiO_2$) with Ag by electroless plating.

II-20: PVF-coated Si—$SiO_2$ (Si:$SiO_2$:PVF weight ratio= 75:15:10) prepared by coating II-12 with PVF.

Preparation of Electrode Sheets:

The positive electrode paste was applied to both sides of a 30 µm thick aluminum foil current collector by means of a blade coater, dried at 150° C., and compression molded by a roller press to obtain a sheet. The sheet was cut into a band of prescribed size, and thoroughly dehydrated by heating with a far infrared heater in a dry box (dry air having a dew point of −50° C. or lower) to prepare a positive electrode sheet.

In the same manner, the negative electrode paste was applied to both sides of a 20 µm thick copper foil current collector and treated to prepare a negative electrode sheet.

The coating weights of the positive electrode paste and the negative electrode paste were adjusted so that the 1st cycle charge capacity at which the positive electrode active material reached 4.2 V with respect to metallic lithium might agreed with the 1st cycle charge capacity at which the negative electrode material became 0.0 V.

Preparation of Electrolytic Solution:

In an argon atmosphere 65.3 g of diethyl carbonate was put in a 200 ml narrow-necked polypropylene container, and 22.2 g of ethylene carbonate was dissolved therein in small portions taking care that the liquid temperature did not exceed 30° C. Then 0.4 g of $LiBF_4$ and 12.1 g of $LiPF_6$ were gradually dissolved therein in this order taking care that the liquid temperature did not exceed 30° C. The resulting electrolytic solution was a colorless clear liquid having a specific gravity of 1.135, a water content of 18 ppm as measured with a Karl Fischer's titration apparatus (Model MKC-210 manufactured by Kyoto Denshi K.K.), and a free acid content of 24 ppm as measured by neutralization titration using Bromothymol Blue as an neutralization indicator and a 0.1N NaOH aqueous solution.

Preparation of Cylinder Battery:

Cylinder batteries having the structure shown in FIG. 1 (diameter: 18 mm; maximum height: 65 mm) were prepared as follows. The positive electrode sheet with a positive electrode lead (4), a finely porous polyethylene film separator, the negative electrode sheet, and the separator were put one on top of another in the order described and rolled up into a cylinder. The electrode group (rolled up) (2) was put in a closed-end battery case (1) made of a nickel-plated iron plate which also served as a negative electrode terminal. An upper insulating plate (3) was inserted therein. The electrolytic solution was poured into the case. A unit composed of a positive electrode terminal (6), an insulating ring, a PTC element (63), a current breaking element (62), and a pressure-sensitive valve (61) was cramped to the open top of the case via a gasket (5) to prepare a cylindrical battery.

The resulting battery was charged at a constant current of 1.5 A until the voltage reached 4.2 V and then at a current controlled so as to maintain the voltage constant at 4.2 V until a 2.5 hour period passed from the start of charging. The charged battery was then discharged to 3.0 V at a constant current of 0.2 C. The discharge capacity, the average discharge voltage, the energy quantity (discharge capacity x average discharge voltage) of the 1st cycle were measured. The charging and discharging (discharging current corresponded to 1 C) were repeated, and the capacity retention (%) in the 30th is cycle (cycle life) was obtained. Additionally, the rate of expansion of the negative electrode on lithium intercalation was obtained in accordance with the method previously described. The results obtained are shown in Table 6 below.

TABLE 6

| Sample No. | Negative Electrode Material | Discharge Capacity (mAh) | Average Discharge Voltage (V) | Energy Quantity (Wh) | Cycle Life (%) | Rate of Expansion |
|---|---|---|---|---|---|---|
| II-1a | II-1a | 2200 | 3.5 | 7.7 | 70 | 2.5 |
| II-Ib | II-1b | 2200 | 3.5 | 7.7 | 75 | 1.8 |
| II-2 | II-2 | 2100 | 3.5 | 7.3 | 80 | 1.4 |
| II-3 | II-3 | 2200 | 3.5 | 7.7 | 78 | 1.6 |
| II-4 | II-4 | 2100 | 3.5 | 7.3 | 83 | 1.3 |
| II-5 | II-5 | 2100 | 3.5 | 7.3 | 82 | 1.4 |
| II-6 | II-6 | 2000 | 3.5 | 7.0 | 80 | 1.5 |
| II-7 | II-7 | 2100 | 3.5 | 7.3 | 82 | 1.4 |
| II-8 | II-8 | 2100 | 3.5 | 7.3 | 82 | 1.4 |
| II-9 | II-9 | 2200 | 3.5 | 7.7 | 81 | 1.5 |
| II-10 | II-10 | 2100 | 3.5 | 7.3 | 82 | 1.4 |
| II-11 | II-11 | 2300 | 3.5 | 8.0 | 78 | 1.6 |
| II-12 | II-12 | 2200 | 3.5 | 7.7 | 85 | 1.2 |
| II-13 | II-13 | 2000 | 3.5 | 7.0 | 75 | 1.8 |
| II-14 | II-14 | 2200 | 3.5 | 7.7 | 78 | 1.6 |
| II-15 | II-15 | 2200 | 3.5 | 7.7 | 80 | 1.5 |
| II-16 | II-16 | 2100 | 3.5 | 7.3 | 81 | 1.5 |
| II-17 | II-17 | 2200 | 3.5 | 7.7 | 82 | 1.4 |
| II-18 | II-18 | 2100 | 3.5 | 7.3 | 86 | 1.2 |
| II-19 | II-19 | 2100 | 3.5 | 7.3 | 87 | 1.2 |
| II-20 | II-20 | 2100 | 3.5 | 7.3 | 86 | 1.2 |

EXAMPLE III-1

Preparation of Negative Electrode Paste:

The following silicic materials (III-1 to III-9) were adjusted to 1 to 5 μm.

III-1: Polycrystalline silicon

Metallurgically synthesized silicon alloys III-2 to III-8 (the ratios in the parentheses are atomic ratios):

III-2: Si—Ag alloy (60:40)
III-3: Si—Al alloy (60:40)
III-4: Si—Ag-Cd alloy (60:30:10)
III-5: Si—Zn alloy (60:40)
III-6: Si—Ge alloy (60:40)
III-7: Si—Ag—Sn alloy (60:30:10)
III-8: Si—Ag—Ni alloy (60:30:10)

III-9: Silicon prepared by removing 100% of Li from the metallurgically synthesized $Li_4Si$ by elution in isopropyl alcohol, and grinding the resulting silicon in argon gas.

Each of the silicic materials III-1 to III-9 was coated simultaneously with $SiO_2$ and nickel by using a nickel plating bath having dispersed therein $SiO_2$ particles having an average particle size of 20 nm. The coated particles were heated at 1000° C. in an argon atmosphere for 30 minutes to prepare negative electrode materials III-1 to III-9.

Each of the negative electrode materials III-1 to III-9 and an equal weight of flaky natural graphite were thoroughly mixed, and 190 g of the resulting mixed powder and 10 g of PVF (binder) were dispersed in 500 ml of N-methyl-2-pyrrolidone to prepare a paste for a negative electrode material mixture.

Preparation of Positive Electrode Paste:

$LiCoO_2$ (200 g) as a positive electrode active material and 10 g of acetylene black were mixed in a homogenizer. Five. grams of PVF was mixed as a binder, and 500 ml of N-methyl-2-pyrrolidone was added thereto, followed by kneading to prepare a paste for a positive electrode material mixture.

Preparation of Electrode Sheets:

The positive electrode paste was applied to both sides of a 30 μm thick aluminum foil current collector by means of a blade coater, dried at 150° C., and compression molded by a roller press to obtain a sheet. The sheet was cut into a band of prescribed size, and thoroughly dehydrated by heating with a far infrared heater in a dry box (dry air having a dew point of −50° C. or lower) to prepare a positive electrode sheet.

In the same manner, the negative electrode paste was applied to both sides of a 20 μm thick copper foil current collector and treated to prepare a negative electrode sheet.

The coating weights of the positive electrode paste and the negative electrode paste were adjusted so that the 1st cycle charge capacity at which the positive electrode active material reached 4.2 V with respect to metallic lithium might agreed with the 1st cycle charge capacity at which the negative electrode material became 0.0 V.

Preparation of Electrolytic Solution:

In an argon atmosphere 65.3 g of diethyl carbonate was put in a 200 ml narrow-necked polypropylene container, and 22.2 g of ethylene carbonate was dissolved therein in small portions taking care that the liquid temperature did not exceed 30° C. Then 0.4 g of $LiBF_4$ and 12.1 g of $LiPF_6$ were gradually dissolved therein in this order taking care that the liquid temperature did not exceed 30° C. The resulting electrolytic solution was a colorless clear liquid having a specific gravity of 1.135, a water content of 18 ppm as measured with a Karl Fischer's titration apparatus (Model MKC-210 manufactured by Kyoto Denshi K.K.), and a free acid content of 24 ppm as measured by neutralization titration using Bromothymol Blue as an neutralization indicator and a 0.1N NaOH aqueous solution.

Preparation of Cylinder Battery:

Cylinder batteries having the structure shown in FIG. 1 were prepared as follows. The positive electrode sheet with a positive electrode lead (4), a finely porous polyethylene film separator, the negative electrode sheet, and the separator were put one on top of another in the order described and rolled up into a cylinder. The electrode group (rolled up) (2) was put in a closed-end battery case (1) made of a nickel-plated iron plate which also served as a negative electrode terminal. An upper insulating plate (3) was inserted therein. The electrolytic solution was poured into the case. A unit composed of a positive electrode terminal (6), an insulating ring, a PTC element (63), a current breaking element (62), and a pressure-sensitive valve (61) was cramped to the open top of the case via a gasket (5) to prepare a cylindrical battery.

The resulting battery was charged at a constant current of 1.5 A until the voltage reached 4.2 V and then at a current controlled so as to maintain the voltage constant at 4.2 V until a 2.5 hour period passed from the start of charging. The charged battery was then discharged to 3.0 V at a constant current of 0.2 C. The discharge capacity, the average discharge voltage, the energy quantity (discharge capacity x average discharge voltage) of the 1st cycle, and the capacity retention (%) in the 30th cycle (cycle life) after the charging and discharging were repented, are shown in Table 7 below.

TABLE 7

| Sample No. | Negative Electrode Material | Discharge Capacity (mAh) | Average Discharge Voltage (V) | Energy Quantity (Wh) | Cycle life (%) |
|---|---|---|---|---|---|
| III-1 | III-1 | 2200 | 3.5 | 7.6 | 84 |
| III-2 | III-2 | 2000 | 3.5 | 7.0 | 88 |
| III-3 | III-3 | 2000 | 3.5 | 7.0 | 88 |
| III-4 | III-4 | 2000 | 3.5 | 7.0 | 90 |
| III-5 | III-5 | 2000 | 3.5 | 7.0 | 89 |
| III-6 | III-6 | 2000 | 3.5 | 7.0 | 88 |
| III-7 | III-7 | 2000 | 3.5 | 7.0 | 89 |
| III-8 | III-8 | 2000 | 3.5 | 7.0 | 89 |
| III-9 | III-9 | 2200 | 3.5 | 7.6 | 83 |

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode having a positive electrode active material, a negative electrode having a negative electrode material, and a nonaqueous electrolyte, wherein said positive electrode active material is a transition metal oxide capable of intercalating and deintercalating lithium, and said negative electrode material comprises at least one silicic material capable of intercalating and deintercalating lithium selected from the group consisting of silicon, a silicon alloy and a silicide, wherein said silicic material has an average particle size of 0.001 to 10 µm, wherein said silicic material is coated with a plurality of materials, and a coating rate of said silicic material is 10% or more, and wherein the negative electrode has a rate of expansion of 1.05 to 3.0 on lithium intercalation.

2. The nonaqueous secondary battery as in claim 1, wherein said silicic material is a silicon alloy.

3. The nonaqueous secondary battery as in claim 1, wherein said silicic material is silicon obtained by removing metal from a metal silicide.

4. The nonaqueous secondary battery as in claim 1, wherein said silicic material has adhered thereto a ceramic that is not reactive with lithium.

5. The nonaqueous secondary battery as in claim 1, wherein said silicic material is coated at least with a metal.

6. The nonaqueous secondary battery as in claim 1, wherein said silicic material is coated with a thermoplastic resin.

7. The nonaqueous secondary battery as in claim 1, wherein said silicic material is coated with a metal and a ceramic.

8. The nonaqueous secondary battery as in claim 1, wherein said silicic material is coated with a metal and a thermoplastic resin.

9. The nonaqueous secondary battery as in claim 1, wherein said negative electrode material further comprises 5 to 1900% by weight of carbon based on said silicic material.

10. The nonaqueous secondary battery as in claim 1, wherein the degree of charging and discharging said silicic imaterial in terms of the atomic ratio of intercalated and deintercalated lithium to silicon, being expressed by x in $Li_xSi$, ranges from 0 to 4.2.

11. The nonaqueous secondary battery as in claim 1, wherein said positive electrode active material comprises at least one compound represented by formula $Li_xMO_2$, wherein M is selected from the group consisting of Co, Ni, Fe, and Mn, and x is from 0 to 1.2. and a compound having a spinel structure represented by formula $Li_yMn_2O_4$ wherein y is from 0 to 2.

12. A process for producing a nonaqueous secondary battery comprising a positive electrode having a positive electrode active material, a negative electrode having a negative electrode material, and a nonaqueous electrolyte, wherein a transition metal oxide capable of intercalating and deintercalating lithium is used as said positive electrode active material, and at least one silicic material capable of intercalating and deintercalating lithium selected from the group consisting of silicon, a silicon alloy and a silicide is used as said negative electrode material, wherein said silicic material has an average particle size of 0.001 to 10 µm, wherein said silicic material is coated with a plurality of materials and a coating rate of said silicic material is 10% or more, and wherein the negative electrode has a rate of expansion of 1.05 to 3.0 on lithium intercalation.

* * * * *